(12) United States Patent
Mori et al.

(10) Patent No.: US 6,711,314 B1
(45) Date of Patent: Mar. 23, 2004

(54) OPTICAL SWITCH CONTROL METHOD AND APPARATUS THEREOF

(75) Inventors: Kazuyuki Mori, Kawasaki (JP); Yuji Tochio, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 318 days.

(21) Appl. No.: 09/998,643

(22) Filed: Dec. 3, 2001

(30) Foreign Application Priority Data

Jul. 17, 2001 (JP) ........................................ 2001-216297

(51) Int. Cl.[7] ................................................ G02B 6/26
(52) U.S. Cl. .............................. 385/17; 385/18; 385/24; 385/39; 385/47
(58) Field of Search ............................... 385/15–19, 24, 385/31, 33, 39, 47

(56) References Cited

U.S. PATENT DOCUMENTS 6,337,760 B1 * 1/2002 Huibers et al. ............. 359/291
6,549,692 B1 * 4/2003 Harel et al. ................... 385/18

* cited by examiner

*Primary Examiner*—Rodney Bovernick
*Assistant Examiner*—Juliana Kang
(74) *Attorney, Agent, or Firm*—Staas & Halsey LLP

(57) ABSTRACT

The present invention aims at providing an optical switch control method capable of controlling at a high speed angles of a plurality of tilt mirrors of an optical switch of three-dimensional structure, by a simplified circuit structure. To this end, for an optical switch including a plurality of mirror arrays each arranged with a plurality of tilt mirrors and in which input optical signals are sequentially reflected by the mirror arrays so as to output the optical signals from particular positions, the optical switch control method according to the present invention is constituted to divide the tilt mirrors on one mirror array into a plurality of fixed regions, to divide the tilt mirrors on the other mirror arrays into a plurality of virtual regions, in accordance with connecting states of optical paths, such that the tilt mirrors in each of the virtual regions and the tilt mirrors in each of the fixed regions are related to each other so as to make pairs. The angle control of reflecting surfaces of the tilt mirrors is performed in parallel for each related regions, and the angle control within each regions is performed in a time-division manner.

24 Claims, 21 Drawing Sheets

CONTROL SYSTEM a

N² PIECES OF TWO-DIMENSIONALLY STRUCTURED MIRRORS

N COLUMNS

N IN NUMBER OF CHANNELS

SPATIAL PROPAGATION DISTANCE

TWO-DIMENSIONALLY STRUCTURED MIRRORS $\propto$ (NUMBER OF CHANNELS)

THREE-DIMENSIONALLY STRUCTURED MIRRORS $\propto$ (NUMBER OF CHANNELS)$^{\frac{1}{2}}$

~50

NUMBER OF CHANNELS

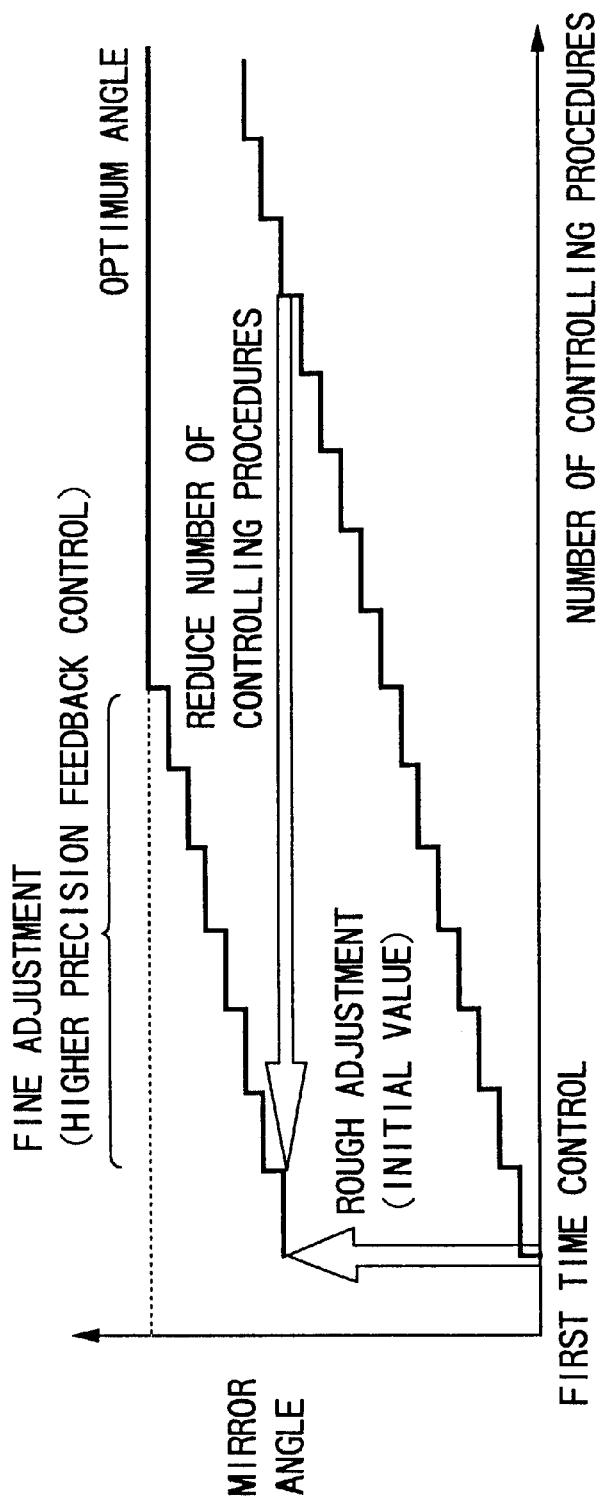

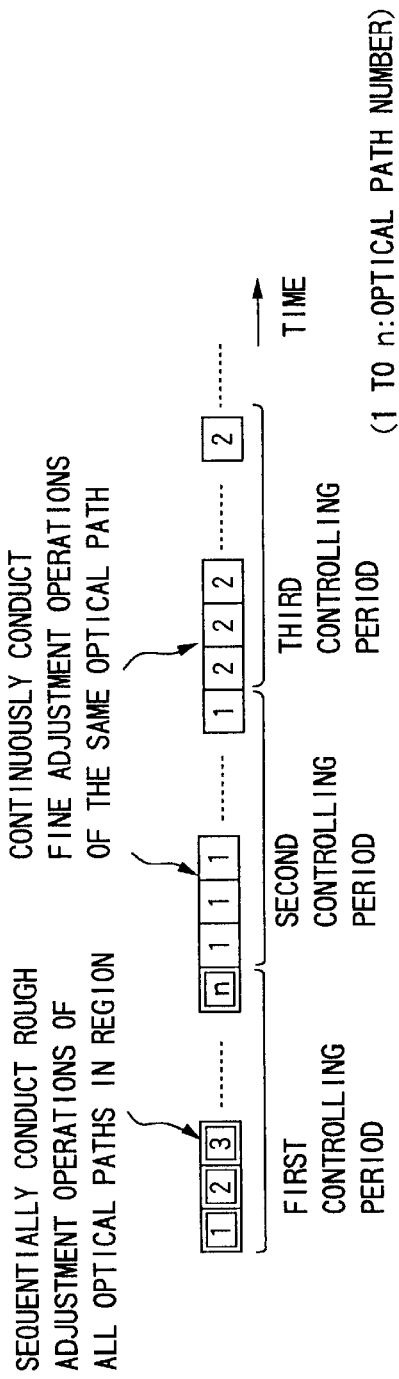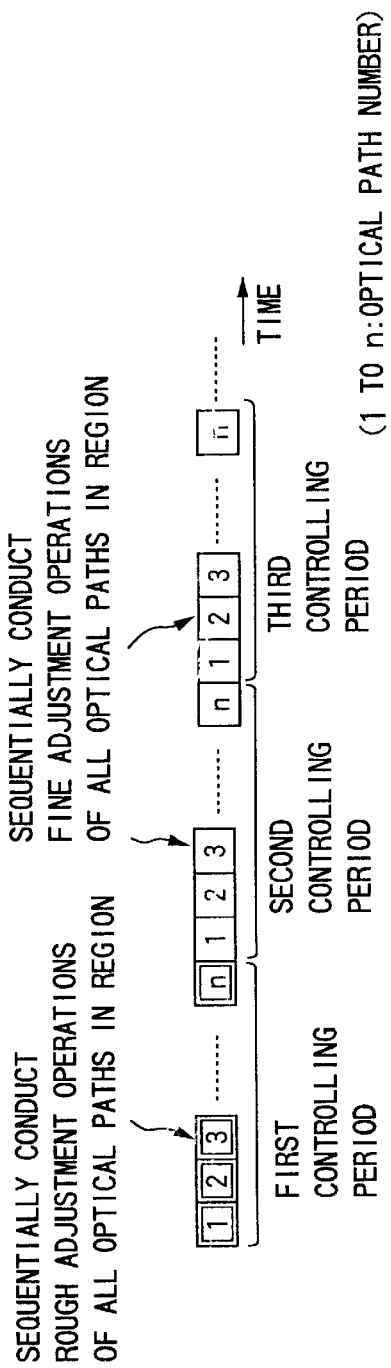

FIG.24 EXAMPLE OF THREE-DIMENSIONALLY STRUCTURED OPTICAL SWITCH

OPTICAL SWITCH CONTROL METHOD AND APPARATUS THEREOF

BACKGROUND OF THE INVENTION (1) Field of the Invention

The present invention relates to a technique for controlling an optical switch to be used in optical communications, and more particularly to a control method and an apparatus of an optical switch of three-dimensional structure using reflective-type tilt mirrors.

(2) Related Art

It is a known fact that data traffic has been explosively increased due to the recent rapid expansion of the Internet. Therefore, since the constitution of optical networks is shifted from a ring-type to a mesh-type, it is required to set and release (provisioning) optical paths in a more dynamic manner. To attain it, a large-scaled optical cross-connecting (XC) device is required. However, currently used XC devices do not have sufficient capacities, and are restricted by the limitation of electrical process due to the increased signal bit rate. Thus, there is demanded realization of a large-scaled optical switch. For such a demand, attention has been directed to those optical switches of three-dimensional structure adopting tilt mirrors such as fabricated by applying a micro machining (MEMS: Micro Electric Mechanical System) technique, as constitutions suitable for realizing a large-scale such as from a viewpoint of coupling loss or the like.

For the optical switch of three-dimensional structure using the aforementioned MEMS mirrors, for example, as shown in FIG. 24, there is known an optical switch constituted by combining: first and second collimator arrays $1_1$, $1_2$ connected with end portions of first and second optical fiber arrays disposed with two-dimensionally arranged N threads of optical fibers, respectively; and first and second mirror arrays $2_1$, $2_2$ disposed with two-dimensionally arranged N numbers of MEMS mirrors. As shown in FIG. 25, for example, in such an optical switch of three-dimensional structure, an optical signal emitted from one of the first collimator array $1_1$ is reflected by the corresponding MEMS mirror of the first mirror array $2_1$, and the thus reflected light is further reflected by the corresponding MEMS mirror of the second mirror array $2_2$ to thereby input to the corresponding output side optical fiber through the corresponding collimator of the second collimator array $1_2$.

In the optical switch of three-dimensional structure using tilt mirrors such as MEMS mirrors, as aforementioned, there is a possibility that, due to angle deviations among the mirrors, the optical signals are input to the output side optical fibers in a deviated manner, thereby causing a factor to increase a loss within the optical switch. Such a coupling defect is caused by a slight angle deviation, even when the input and output ports are determined the angles of the tilt mirrors at the input and output sides are known values. As such, it is desired to control, with high precision, the angles of the input side and output side tilt mirrors with respect to paths of optical signals corresponding to the input and output channels.

However, for the aforementioned optical switch of three-dimensional structure, no specific techniques concerning the angle control for tilt mirrors have been conventionally proposed.

SUMMARY OF THE INVENTION

The present invention has been performed in view of the points as described above, and has an object to provide an optical switch control method and an apparatus thereof, capable of controlling, at a high speed, angles of a plurality of tilt mirrors of an optical switch of three-dimensional structure, by a simplified circuit structure.

To achieve the above object, the present invention provides an optical switch control method which comprises a plurality of mirror arrays each arranged with a plurality of tilt mirrors each having an angle-controllable reflecting surface, and reflects input optical signals sequentially by the respective mirror arrays, to output the optical signals from particular positions, for controlling an angle of the reflecting surface of each tilt mirror on each of the mirror arrays, wherein the tilt mirrors on one mirror array of the plurality of mirror arrays are divided into a plurality of fixed regions. Further, the tilt mirrors on the other mirror array of the plurality of mirror arrays are divided into a plurality of virtual regions, in accordance with connection states of optical paths, such that the tilt mirrors in each of the virtual regions and the tilt mirrors in each of the fixed regions are related to each other so as to make pairs. Then, an angle control of reflecting surfaces of the tilt mirrors is performed in parallel for every related regions, and the angle control of reflecting surfaces of the tilt mirrors in the related regions is performed in a time-division manner corresponding to the optical paths.

According to such an optical switch control method, the angle control of the tilt mirrors on the plurality of mirror arrays is performed in parallel and independently for every related fixed and virtual regions in accordance with the connection states of optical paths, and the angle control of the tilt mirrors in each of the related regions is performed in a time-division manner. Therefore, it becomes possible to simultaneously realize the miniaturization of circuit scale and the shortening of controlling time.

Further, in the above control method, the power of each optical signal after sequentially reflected by the tilt mirrors of the mirror arrays may be detected, to feedback control the angles of reflecting surfaces of the tilt mirrors so that the detected optical signal power is increased. By performing such a feedback control, it becomes possible to control the angles of tilt mirrors with higher precision, thereby enabling to reduce a loss within the optical switch.

Moreover, the angle control of reflecting surfaces of the tilt mirrors may be performed by-conducting the fine adjustment by the feedback control after conducting the rough adjustment based on a previously set initial value. By applying such a control method, it becomes possible to further shorten the controlling time.

In addition, the angle control to be in parallel performed in each related regions may be performed with the synchronization between the respective regions. According to such a control method, it is possible to instantaneously conduct the exchange of virtual regions even in changing the optical path connection over different regions, to thereby avoid a delay of the angle control.

An optical switch control apparatus according to the present invention is constituted by applying the control method as mentioned above. The specific constitution of the control apparatus shall be described in detail in the following embodiments.

Other objects, features and advantages of the present invention will become more apparent from the following description of preferred embodiments when read in conjunction with the accompanying drawings.

BRIEF DESCRIPTION OF THE DRAWINGS

FIG. 9 is a graph for explaining an operation of angle control for performing the rough adjustment and fine adjustment in the embodiment of the present invention;

FIG. 10 is a diagram for explaining a preferred example of angle control taking account of resonance of MEMS mirrors in the embodiment of the present invention;

FIG. 11 is a diagram for explaining another preferred example of angle control taking account of resonance of MEMS mirrors in the embodiment of the present invention;

DETAILED DESCRIPTION OF THE INVENTION

Figure 1:
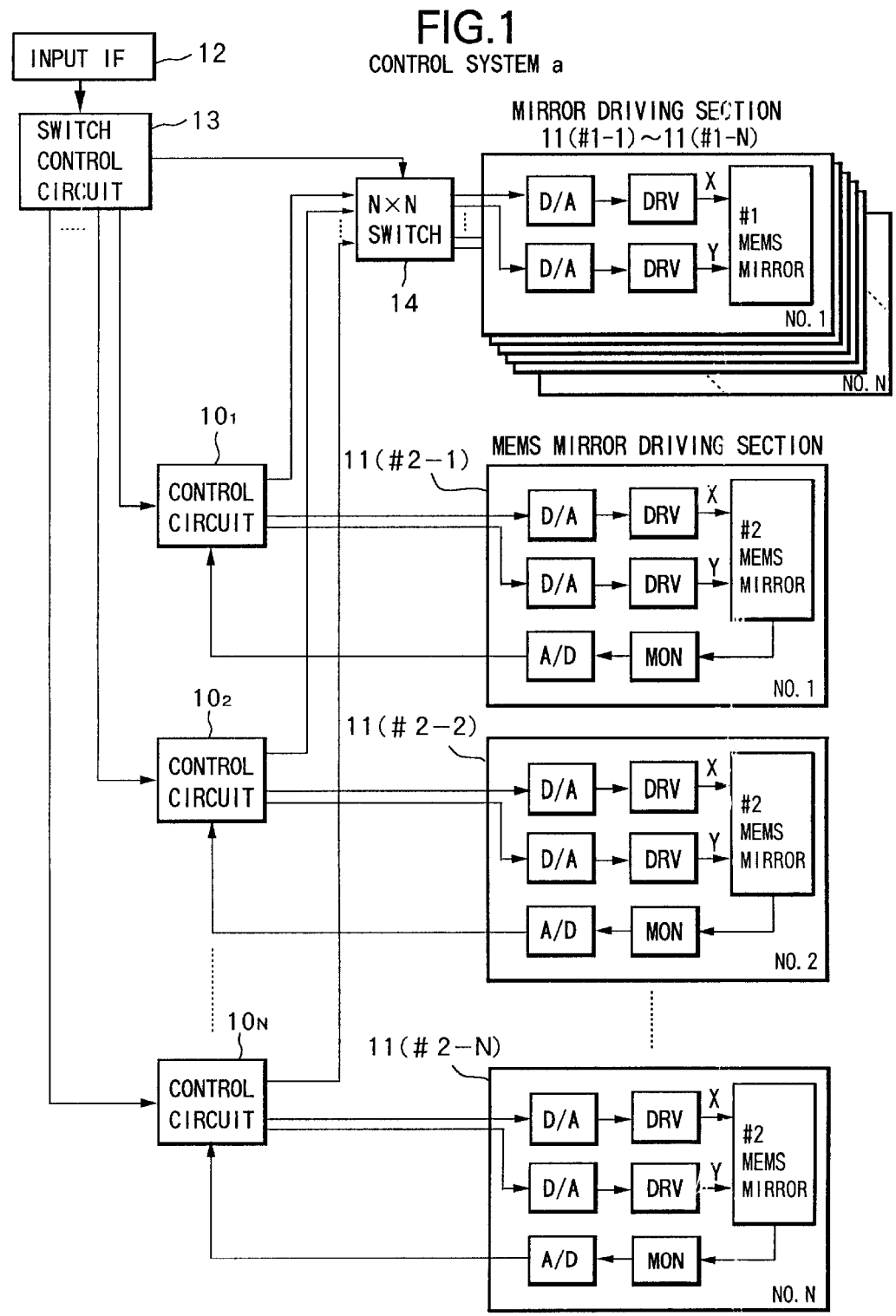
FIG. 1 is a block diagram showing an example of a basic control system conceivable for an optical switch of three-dimensional structure.

There will be described hereinafter embodiments of the present invention, with reference to the accompanying drawings. In the drawings, those identical constitutional elements are denoted by the same reference numerals, respectively, and the repeated explanation thereof shall be omitted.

Firstly, a brief description will be made for a basic control system conceivable as a technique for controlling an optical switch of three-dimensional structure using tilt mirrors.

Figure 2:
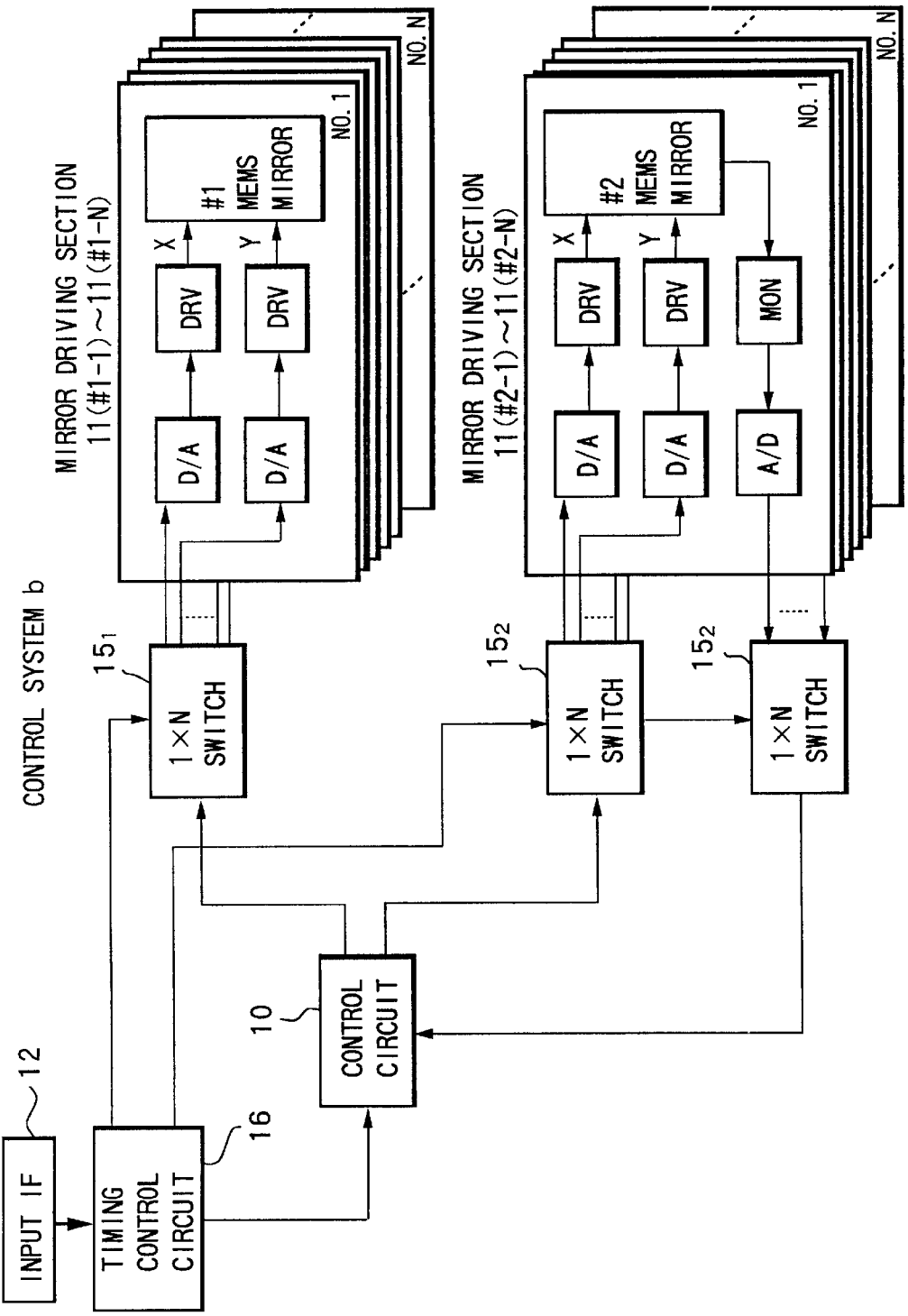
FIG. 2 is a block diagram showing another example of a basic control system conceivable for an optical switch of three-dimensional structure.

As a system for controlling angles of MEMS mirrors of first and second mirror arrays $2_1$, $2_2$ in the optical switch of three-dimensional structure shown in FIG. 24, there can be conceived a system, for example as shown in FIG. 1, in which a control circuit is provided for each path (hereinafter called "optical path") of an optical signal from a certain input side optical fiber up to a certain output side optical fiber, so as to simultaneously control the angles of the MEMS mirrors corresponding to all of the optical paths (this system shall be called a control system "a", hereinafter); and the other system, for example as shown in FIG. 2, in which a single control circuit is provided for all of the optical paths, so as to control the angles of the MEMS mirrors in a time-division manner (this system shall be called a control system "b", hereinafter).

Here, it is assumed, for the control systems "a" and "b", that a feedback control is executed for monitoring the power of optical signal to be introduced into the output side optical fiber to thereby reflect the monitored result to the angle control of the MEMS mirrors, in order to control the angles of the MEMS mirrors with high precision and to prevent a large change in loss within the optical switch due to fluctuations of environmental conditions such as temperature changes, vibrations or the like.

In the control system "a" of FIG. 1, assuming now that the number of optical paths of the optical switch is N, for example, N numbers of control circuits $10_1$, $10_2$, ... $10_N$ are provided corresponding to the optical paths so as to simultaneously operate the control circuits $10_1$ to $10_N$, to thereby control operations of mirror driving sections 11(#1-1) to 11(#1-N), 11(#2-1) to 11(#2-N) corresponding to MEMS mirrors (hereinafter called "#1-MEMS mirrors" as the case may be) of the first mirror array $2_1$ and MEMS mirrors (hereinafter called "#2-MEMS mirrors" as the case may be) of the second mirror array $2_2$.

Note, since the specific constitution of the aforementioned control circuits and mirror driving sections are described in detail in U.S. patent application Ser. No. 09/949,913 which is a prior patent application by the present applicant, the outline of them shall be explained here.

In FIG. 1, an input interface (IF) 12 is given with input and output channel information, such as an optical path connecting command from the exterior. The information provided via the input interface 12 is sent to a switch control circuit 13 so that such as the information concerning the connection setting is provided to the control circuits $10_1$ to $10_N$ and to an N×N switch 14. This N×N switch 14 is an electrical switch for supplying control signals corresponding to the connection setting of optical paths from the control circuits $10_1$ to $10_N$, to the mirror driving sections 11(#1-1) to 11(#1-N) at the #1-MEMS mirror side; in accordance with the information from the switch control circuit 13.

Further, each of the mirror driving sections 11(#1-1) to 11(#1-N) at the #1-MEMS mirror side includes, for example, D/A converters and driving circuits (DRVs) corresponding to the two axes (X-axis and Y-axis) of the #1-MEMS mirror, respectively, and provides the control signals supplied via the N×N switch 14 to the driving circuits after D/A converting the control signals, to adjust the angles in the respective axis directions of the #1-MEMS mirror. Similarly to these mirror driving sections 11(#1-1) to 11(#1-N), each of the mirror driving sections 11(#2-1) to 11(#2-N) at the #2-MEMS mirror side includes D/A converters and driving circuits (DRVS) corresponding to the two axes (X-axis and Y-axis) of the #2-MEMS mirror, respectively. Further, each of the mirror driving sections 11(#2-1) to 11(#2-N) is provided with a monitor circuit (MON) for detecting the power of optical signal to be introduced into the corresponding output side optical fiber, and an A/D converter, so that the optical power detected by the monitor circuit is fed back via the A/D converter to the corresponding one of the control circuits $10_1$ to $10_N$.

In the control system "b" of FIG. 2, a 1×N electrical switches $15_1$ and $15_2$ are inserted between a single control circuit 10 for controlling the operations of the mirror driving sections 11(#1-1) to 11(#1-N), 11(#2-1) to 11(#2-N), and the mirror driving sections at the #1-MEMS mirror side and at the #2-MEMS mirror side, respectively. Operations of the 1×N switches $15_1$, $15_2$ are controlled by a timing control circuit 16, so that the operations of the mirror driving sections 11(#1-1) to 11(#1-N), 11(#2-1) to 11(#2-N) are sequentially controlled in a time-division manner.

Note, the constitutions of the input interface 12 and the mirror driving sections 11(#1-1) to 11(#1-N), 11(#2-1) to 11(#2-N) in the control system "b" are the same as those in the aforementioned control system "a".

Meanwhile, there are thought of the following defects, concerning the aforementioned control systems "a" and "b". Namely, for the control system "a", since N numbers of control circuits $10_1$ to $10_N$ are required for controlling the respective MEMS mirrors, there is caused a defect of an enormous increase of the whole size of the optical switch including these control circuits. Further, with the enlargement of size of the optical switch, the control system "a" is susceptible to affections such as exterior noises since the distances between the control circuits $10_1$ to $10_N$, and the mirror driving sections 11(#1-1) to 11(#1-N), 11(#2-1) to 11(#2-N) become longer. Thereby, there is also a possibility that the selection of transmission cables requires a careful attention such as in case of transmitting high-speed control signals, resulting in the installing limitations to become severer.

For the control system "b", it is considered that there may be caused such a defect of an excessively extended controlling time for when the connection setting of all of the optical paths is to be performed at once at the initial actuation, since the operations of the mirror driving sections 11(#1-1) to 11(#1-N), 11(#2-1) to 11(#2-N) corresponding to the respective optical paths are controlled sequentially in a time-division manner. Meanwhile, generally a changeover from a troubled optical path to another optical path is conducted in an optical transmission apparatus. As the controlling time for such a changeover between optical paths, it is required 10 ms or less, for example, so as to ensure the transmission quality. It may be difficult for the control system "b" to satisfy such a requirement for the controlling time.

Moreover, as an essential problem in optical switch adopting MEMS mirrors, there can be mentioned a considerably long time required for convergence of the mechanical resonance of MEMS mirrors in a case of controlling angles of the MEMS mirrors at a high speed, since switching elements mechanically operate in themselves, commonly in the control systems "a" and "b".

Figure 3:
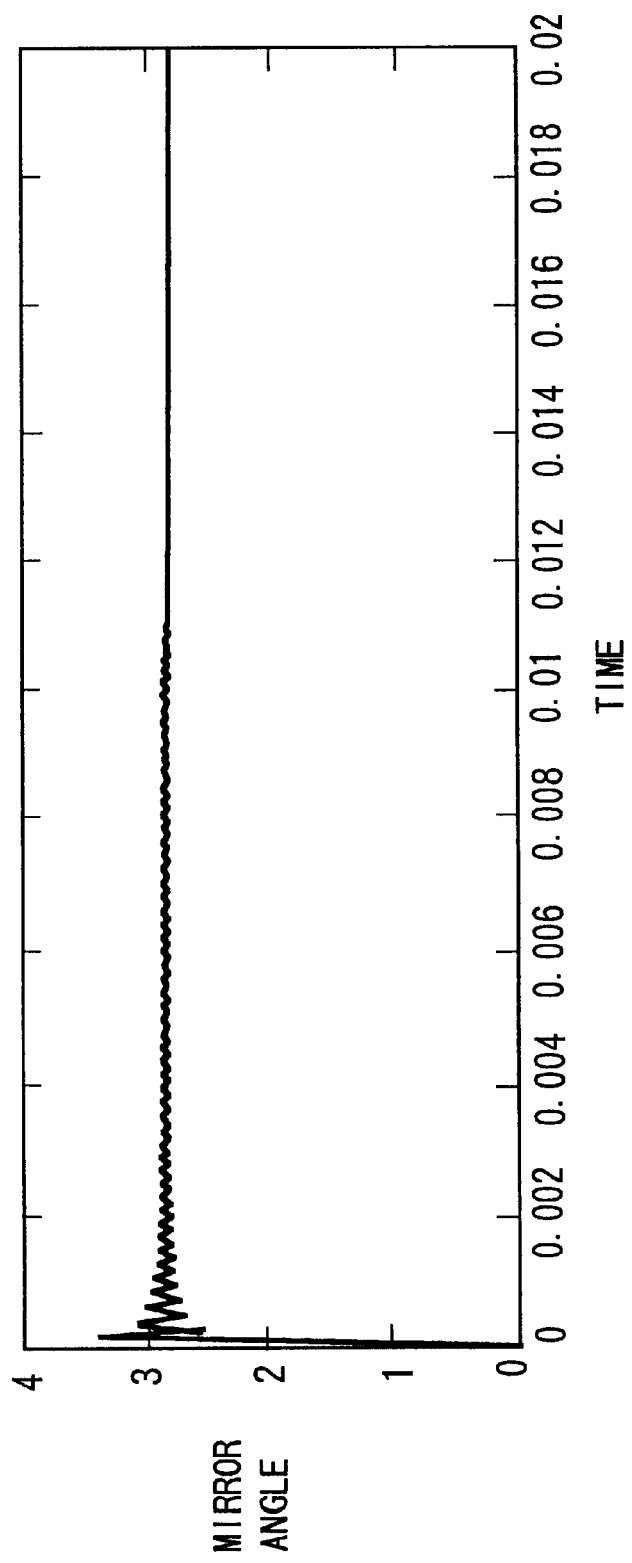
FIG. 3 is a graph showing an example of a response characteristic concerning angle control of an MEMS mirror.

FIG. 3 is a graph showing an example of a response characteristic concerning angle control of a MEMS mirror. As shown in the figure, when the angle of MEMS mirror is changed at a high speed, there is caused resonance of amplitude corresponding to the magnitude of the changed angle, such that the amplitude is converged to a certain angle while being gradually attenuated. Thus, the controlling time may be further prolonged-in the control system "b", for example, since this control system "b" requires a time period until the convergence of the resonance of the MEMS mirror, in addition to the calculation time period for the control circuit 10.

In addition, in the optical switch using MEMS mirrors, each MEMS mirror itself is very small and has a small mass, thereby causing another essential problem that the MEMS mirror is strongly affected by vibrations in the environment where the optical switch is arranged. As aforementioned, in the case of the optical switch of three-dimensional structure, the optical coupling characteristic between the input and output is largely fluctuated by a slight angle deviation between the mirrors. Therefore, there is a possibility that the optical power is momentarily reduced. This may deteriorate a transmission quality such as an error rate characteristic in an optical communication system utilizing such an optical switch.

Accordingly, there will be described in detail hereinafter the optical switch control method and apparatus thereof according to the present invention, for diminishing the circuit scale while keeping the controlling time substantially equivalent to that in the control system "a", and for realizing a downsized optical switch having a stable characteristic against the affection such as a fluctuation of the external environment.

Figure 4:
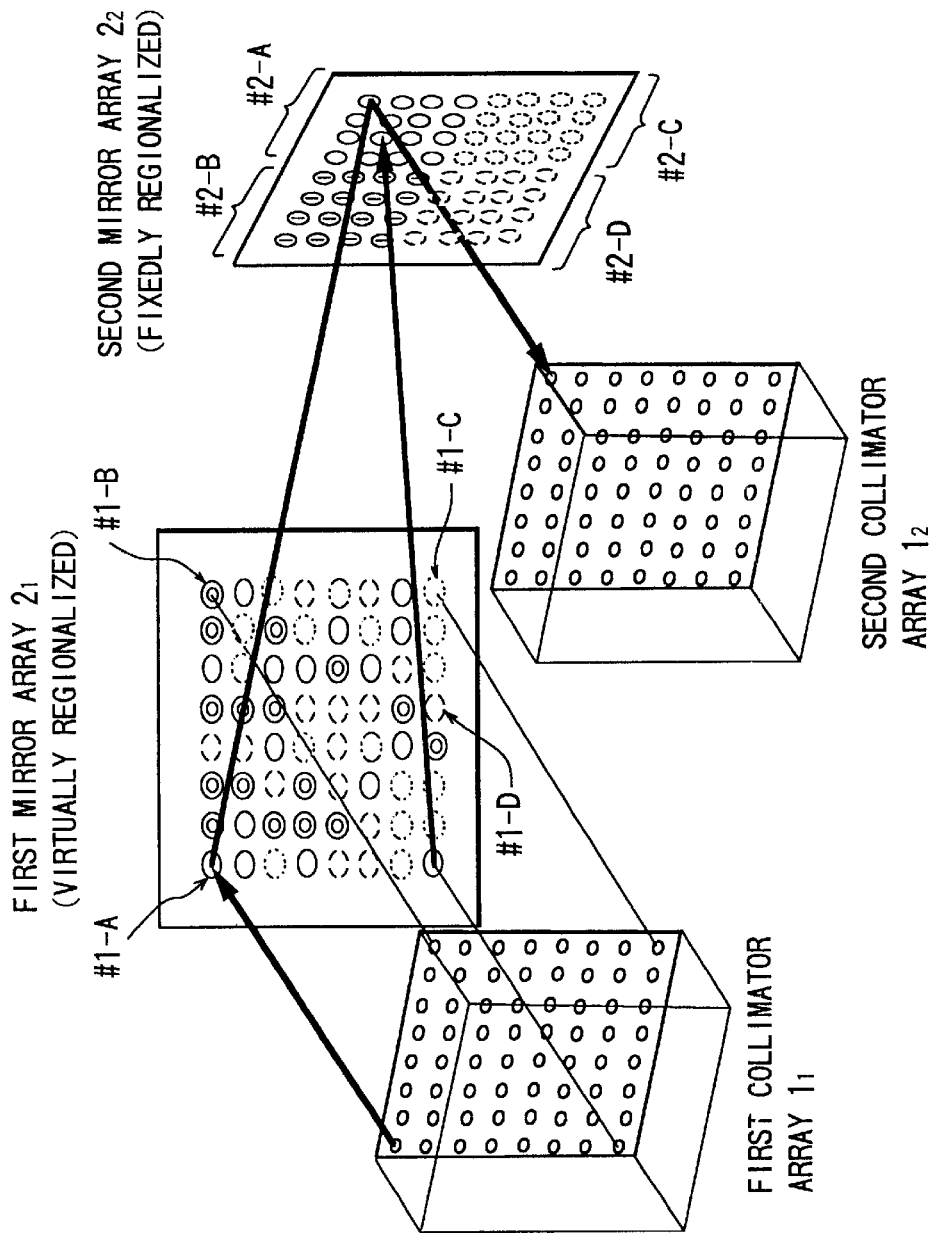
FIG. 4 is a conceptual view for explaining a basic principle of a optical switch control method according to the present invention.
Figure 5:
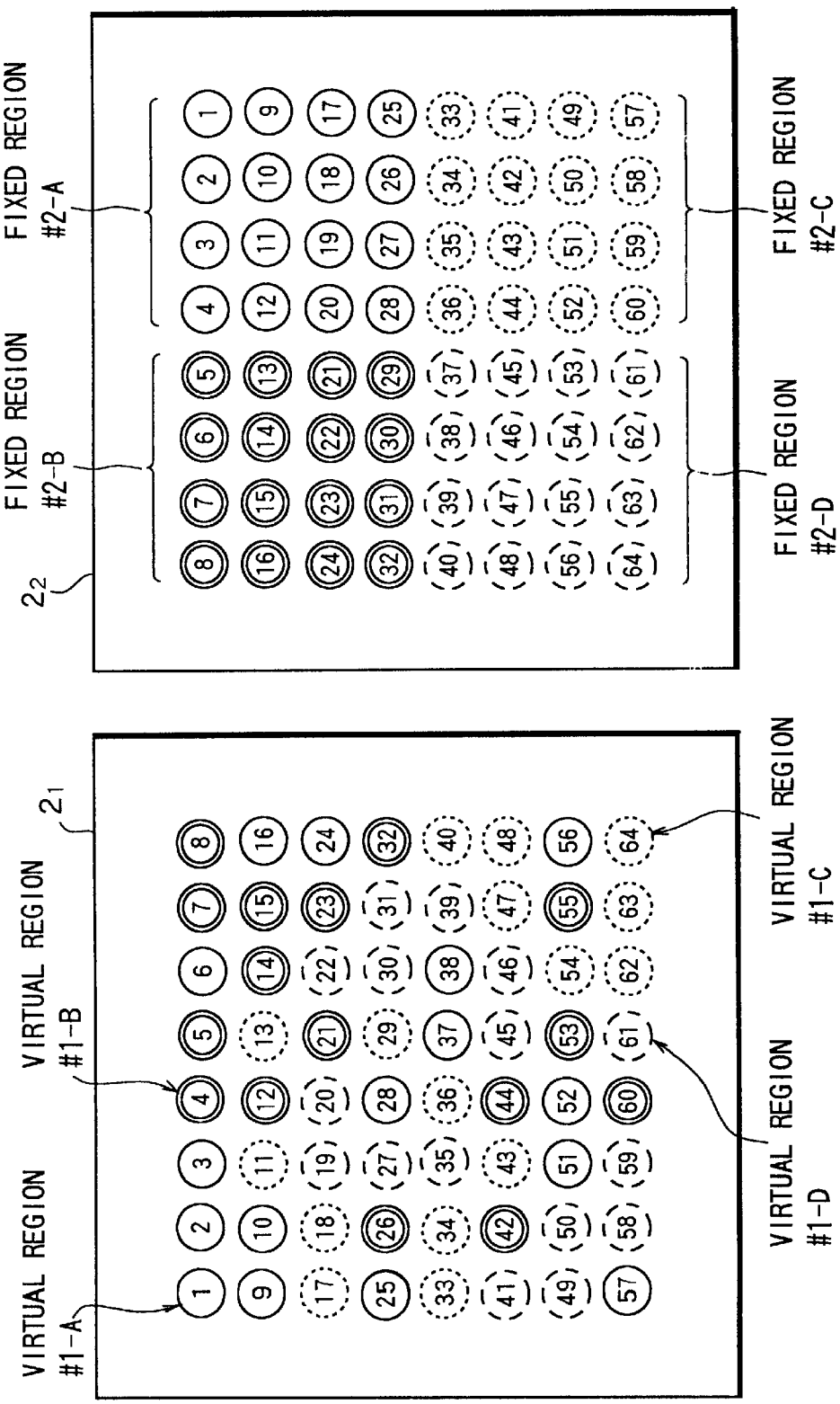
FIG. 5 is a diagram showing a specific example of regions to be set for respective mirror arrays of FIG. 4.

FIG. 4 is a conceptual view for explaining a basic principle of the optical switch control method according to the present invention. Further, FIG. 5 is a diagram showing a specific example of regions to be set for respective first and second mirror arrays $2_1$, $2_2$ of FIG. 4. Here, the number of switching elements (MEMS mirrors) to be arranged in one optical path is set at two, for example, for simplifying the explanation. However, the present invention is not limited thereto, and it is possible to arrange three or more switching elements within one optical path.

Figure 24:
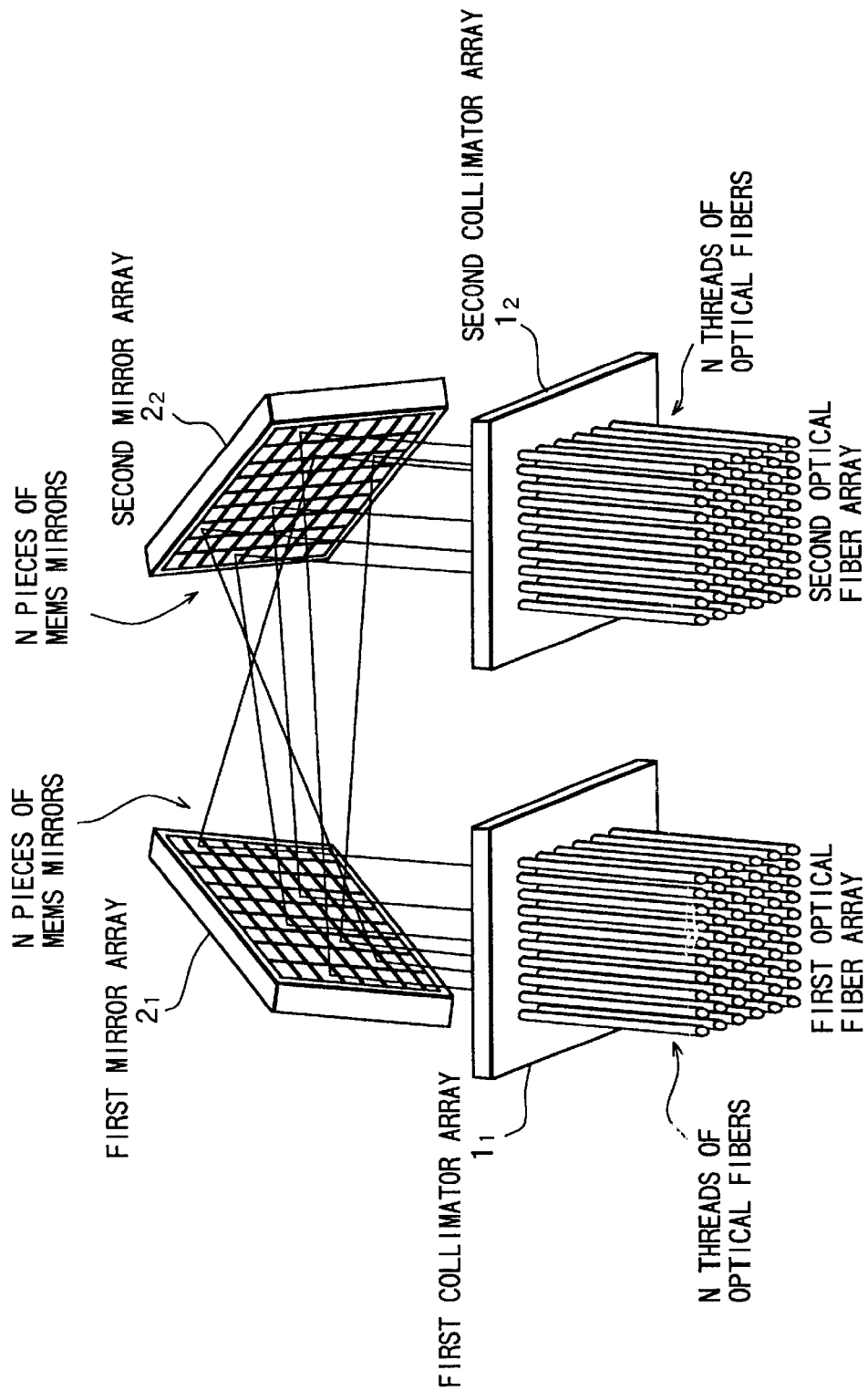
FIG. 24 is a perspective view showing an example of an optical switch of three-dimensional structure to which the present invention is applied.
Figure 25:
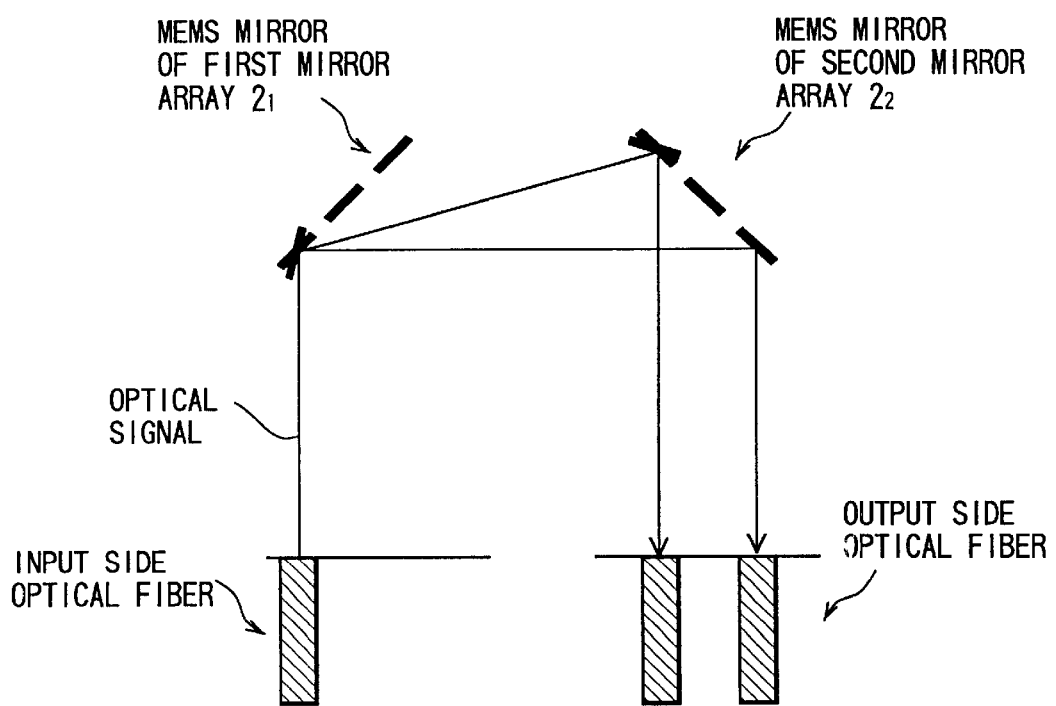
FIG. 25 is a plan view showing a propagation path of an optical signal in the optical switch of FIG. 24.

As shown in FIGS. 4 and 5, the optical switch control method according to the present invention is constituted, for example, in an optical switch of three-dimensional structure as shown in FIG. 24, such that for one of the first and second mirror arrays $2_1$, $2_2$, a plurality of fixed regions are previously set; and for the other of these mirror arrays, a plurality of virtual regions are set corresponding to the fixed regions set in the one of the mirror arrays, in accordance with an optical path connecting command to be supplied from the exterior or the like. Specifically, for 64 numbers of MEMS mirrors of the second mirror array $2_2$ in the example shown in FIGS. 4 and 5, four fixed regions #2-A (single-line circle), #2-B (double-line circle), #2-C (dotted-line circle), and #2-D (broken-line circle) are previously set. Further, 64 numbers of MEMS mirrors of the first mirror array $2_1$ are divided into any one of four virtual regions #1-A (single-line circle), #1-B (double-line circle), #1-C (dotted-line circle) and #1-D (broken-line circle) in accordance with the optical path connecting command, so as to correspond to the fixed regions.

Specifically explaining the region setting example of FIG. 5, for the second mirror array $2_2$, the fixed region #2-A includes the MEMS mirrors of No. 1 to No. 4, No. 9 to No. 12, No. 17 to No. 20, and No. 25 to No. 28, the fixed region #2-B includes the MEMS mirrors of No. 5 to No. 8, No. 13 to No. 16, No. 21 to No. 24, and No. 29 to No. 32, the fixed region #2-C includes the MEMS mirrors of No. 33 to No. 36, No. 41 to No. 44, No. 49 to No. 52, and No. 57 to No. 60, and the fixed region #2-D includes the MEMS mirrors of No. 37 to No. 40, No. 45 to No. 48, No. 53 to No. 56, and No. 61 to No. 64. Then, when a command to connect No. 1 MEMS mirror of the first mirror array $2_1$ to No. 10 MEMS mirror of the second mirror array $2_2$ is transmitted in accordance with the optical path connecting command, for example, the No. 1 MEMS mirror of the first mirror array $2_1$ is rendered to be included in the virtual region #1-A corresponding to the fact that No. 10 MEMS mirror of the second mirror array $2_2$ is included in the fixed region #2-A.

Generalizing here the relationship between the number of optical paths and the number of fixed regions or virtual regions, N in number of optical paths can be represented by the following equation (1), by using "m" in number of fixed regions (or virtual regions) and "n" in number of paths within one region:

$$N = m \times n \quad (1).$$

In this way, by setting a plurality of fixed regions (four fixed regions, here) for any one of a plurality of mirror arrays (two mirror arrays, here) in a optical switch of three-dimensional structure, and by dividing the MEMS mirrors of each of other mirror arrays into a plurality of virtual regions relating to the fixed regions, respectively, it becomes possible to dispose a control circuit for each fixed region so as to perform the angle control. Thereby, it becomes possible to provide an optical switch control method capable of diminishing the circuit scale and realizing the high speed angle control. Namely, according to the control method of the present invention, the angle control for the respective MEMS mirrors of the first and second mirror arrays $2_1$, $2_2$ is performed by four control circuits disposed corresponding to the previously set fixed regions #2-A to #2-D, in parallel for the respective regions (fixed regions #2-A to #2-D and virtual regions #1-A to #1-D), and the angle control for the MEMS mirrors in the same region is performed in a time-division manner. Thus, it becomes possible to drastically diminish the control circuit scale as compared with the aforementioned control system "a", and to sufficiently shorten the controlling time as compared with the aforementioned control system "b", thereby enabling to realize the high speed angle control.

There will be described in detail hereinafter an embodiment of a control apparatus constituted by applying the aforementioned basic principle of the optical switch control method according to the present invention.

Figure 6:
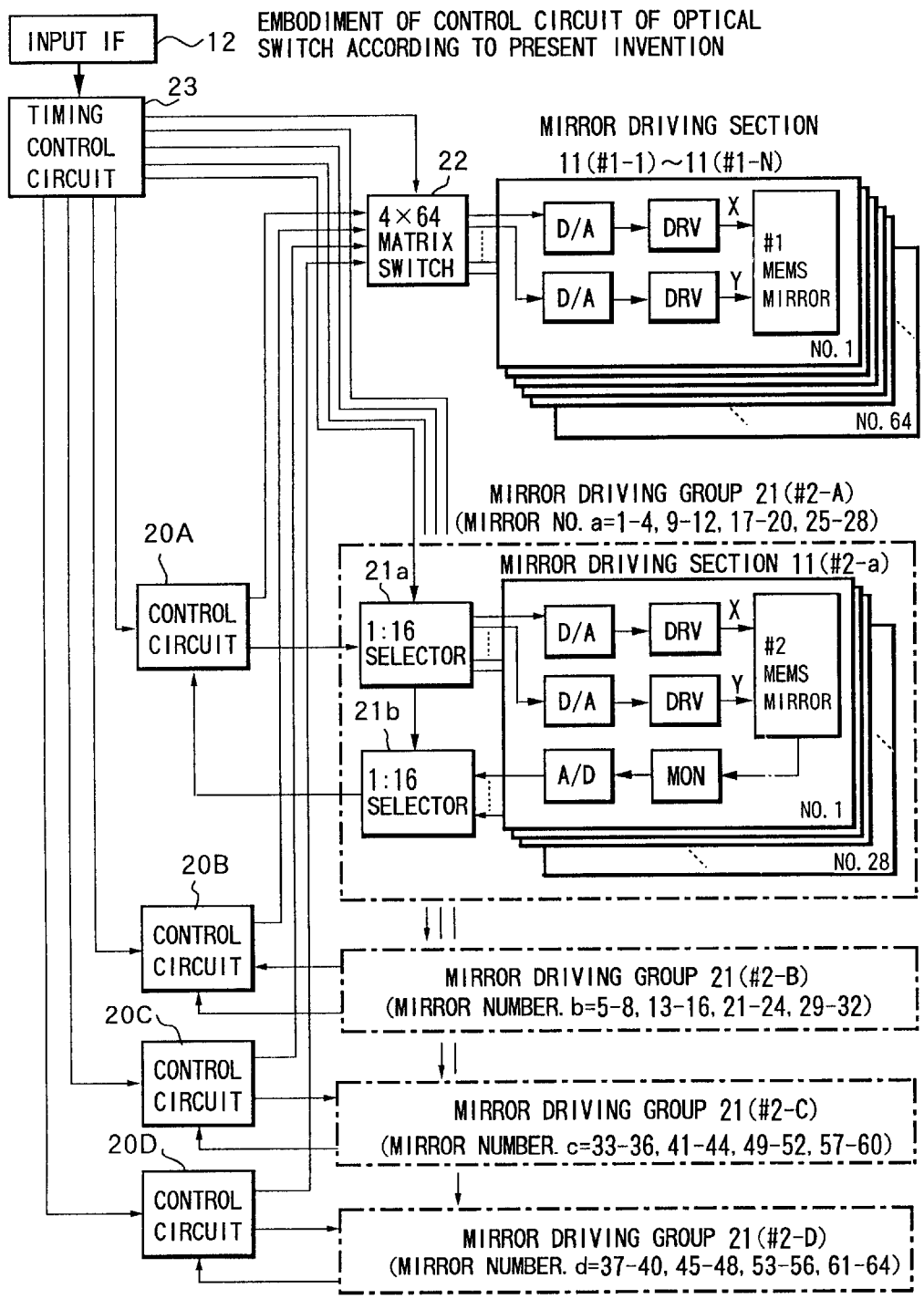
FIG. 6 is a block diagram showing a constitution of an embodiment of an optical switch control apparatus according to the present invention.

FIG. 6 is a block diagram showing a constitution of the embodiment of an optical switch control apparatus according to the present invention.

In FIG. 6, the control apparatus of the present embodiment includes four control circuits 20A, 20B, 20C and 20D corresponding to the four fixed regions #2-A, #2-B, #2-C and #2-D set in the second mirror array $2_2$ similarly to the example shown in FIGS. 4 and 5, for the optical switch of three-dimensional structure shown in FIG. 24. The control circuits 20A to 20D are connected, respectively, to mirror driving groups 21(#2-A), 21(#2-B), 21(#2-C), 21(#2-D) provided by grouping the mirror driving sections corresponding to the fixed regions #2-A, #2-B, #2-C and #2-D, for the MEMS mirrors of the second mirror array $2_2$, and to mirror driving sections 11(#1-1) to 11(#1-64) for the respective MEMS mirrors of the first mirror array $2_1$, via a 4×64 matrix switch 22.

The mirror driving group 21(#2-A) includes mirror driving sections 11(#2-a; a=1 to 4, 9 to 12, 17 to 20, 25 to 28) for driving the respective MEMS mirrors of No. 1 to No. 4, No. 9 to No. 12, No. 17 to No.20, and No. 25 to No. 28 set in the fixed region #2-A, and 1:16 selectors 21a, 21b. The constitution of each mirror driving section is the same as that explained in the aforementioned control system "a". The 1:16 selector 21a is to transmit the control signal output from the control circuit 20A to any one of the mirror driving sections. The 1:16 selector 21b is to selectively feedback any one of monitor signals for the output optical powers sent from the A/D converters of the respective mirror driving sections to the control circuit 20A.

In FIG. 6, there the specific constitution has been described for the mirror driving group 21(#2-A) only. However, the constitutions of the mirror driving groups 21(#2-B), 21(#2-C) and 21(#2-D) are the same as that of the mirror driving group 21(#2-A).

The changeover timings for the 1:16 selectors 21a, 21b of the mirror driving groups 21(#2-A) to 21(#2-D) and for the 4×64 matrix switch 22 are controlled in a time-division manner in accordance with timing control signals to be output from a timing control circuit 23, such that the mirror driving sections for driving the #1-MEMS mirrors and #2-MEMS mirrors paired by the connection of optical paths, are simultaneously connected to the control circuits 20A to 20D, respectively.

The timing control circuit 23 determines the control order corresponding to each region based on the optical path connecting command or the like to be supplied via the input interface (IF) 12, to thereby generate the aforementioned timing control signals, and supplies the information concerning the connection setting of optical paths to the respective control circuits 20A to 20D. In response to the information from the timing control circuit 23, the control circuits 20A to 20D generate control signals for controlling the angles of #1-MEMS mirrors and #2-MEMS mirrors corresponding to the connection setting of optical paths, respectively.

For example, as a method for determining the control orders by the timing control circuit 23, it is possible to previously set the control order for all of the optical paths within each of the fixed regions #2-A to #2-D, and then, to set the control order for optical paths within each virtual region corresponding to the optical path connecting command in accordance with the previously set control orders for the fixed regions.

Figure 7:
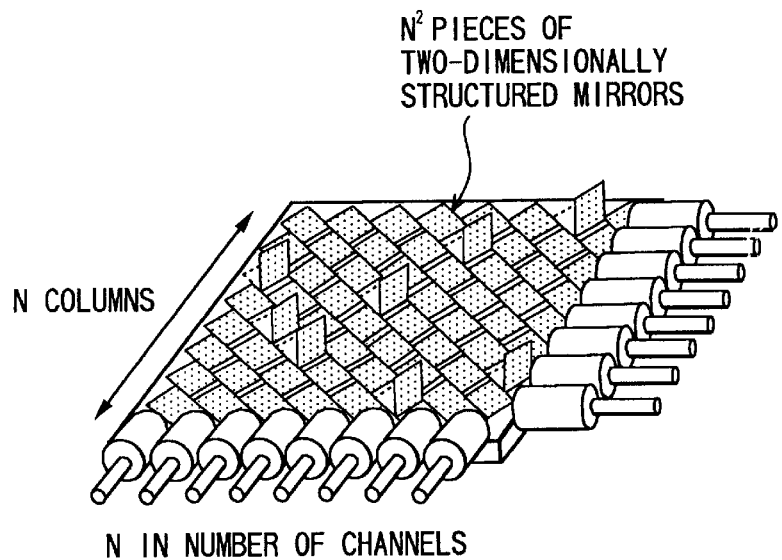
FIG. 7 is a view showing an example of an optical switch using a general mirror of two-dimensional structure.
Figure 8:
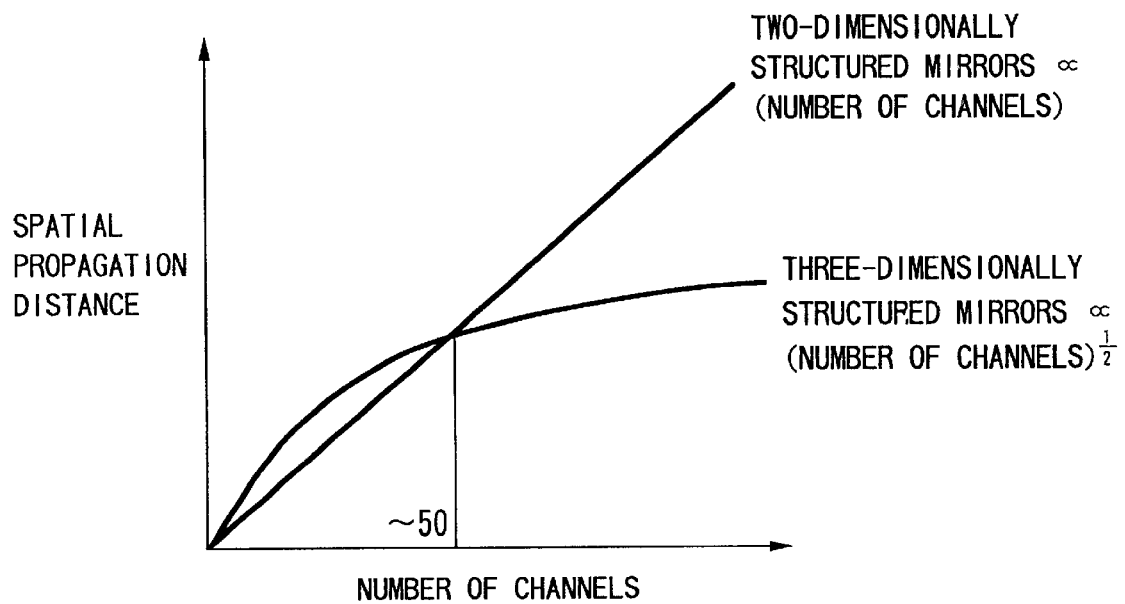
FIG. 8 is a graph illustrating relationships of spatial propagation distances of optical signals to the number of channels of optical switches, concerning mirrors of two-dimensional structure and mirrors of three-dimensional structure, respectively.

As the MEMS mirrors of the first and second mirror arrays $2_1, 2_2$ to be angle controlled by the control apparatus having the aforementioned circuit structure, for example, it is preferable to use mirrors having three-dimensional structure of a so-called beam steering type suitable to form optical switches of three-dimensional structure. According to the mirror structure of the beam steering type, it is possible to freely control the angles of the reflecting surface in the two axis directions, thereby allowing to connect a certain input port to any one of all output ports (i.e., path establishment). Such mirrors of three-dimensional structure are optimum for forming a large scaled optical switch, since these mirrors are able to downsize the optical system as compared with a situation for using mirrors of two-dimensional structure such as shown in FIG. 7. Illustrated in a graph of FIG. 8 are relationships of spatial propagation distances of optical signals to the number of channels of optical switches, for the mirrors of two-dimensional structure and the mirrors of three-dimensional structure, respectively. In the relationships shown in FIG. 8, it can be seen that when the number of channels exceed 50, it becomes possible to form a smaller sized optical switch by using mirrors of three-dimensional structure.

Further, the aforementioned mirrors of three-dimensional structure is be fabricated on a wafer of Si or the like by applying the MEMS technique, so that a large-scaled mirror array can be formed collectively making use of the existing process. Those mirrors are advantageous especially in the size of optical system in optical switch. Note, those mirrors to be used in optical switches to be applied with the present invention are not limited to the aforementioned three-dimensionally structured MEMS mirrors, and it is possible to use known tilt mirrors.

Further, in the control apparatus of the present embodiment, as specific methods for monitoring the output optical powers to be monitored at the respective mirror driving sections at the second mirror array $2_2$ side so as to feedback control the angles of the MEMS mirrors, it is possible to apply a method for branching an optical signal at a point upstream of the output side optical fiber by using a prism or the like to thereby detect a power of the optical signal, or a method for branching an optical signal coupled to the output side optical fiber by an optical coupler or the like to thereby detect a power of the optical signal. Particularly, in a case where the latter monitoring method for branching the optical signal once coupled to the output side optical fiber to thereby detect the power of the optical signal is applied, it becomes possible to perform the feedback control for the respective MEMS mirrors with high precision, since there can be avoided such a situation that the monitored optical power and the optical power of the optical signal actually coupled to the output side optical fiber are inconsistent with each other due to an affection by assembling errors of the optical system or the like. Note, the monitoring method of output optical powers in the present invention is not limited to the above examples, and it is possible to apply a typical monitoring method of optical signal power.

In the optical switch applied with the control apparatus of the aforementioned embodiment as described above, the angle control for the MEMS mirrors of the first mirror array $2_1$ and second mirror array $2_2$ is executed in parallel for every regions A to D (virtual regions #1-A to #1-D, and fixed regions #2-A to #2-D) by the four control circuits 20A to 20D, respectively, while the angle control for MEMS mirrors in each of the regions A to D is executed in a time-division manner. Thus, it becomes possible to provide a control apparatus for an optical switch of three-dimensional structure, realizing a diminished circuit scale and a shortened controlling time.

There will be hereinafter described in detail specific examples of angle control by the control circuits 20A to 20D.

Firstly, there will be described in detail a preferable specific example of angle control taking account of the aforementioned resonance of MEMS mirror as shown in FIG. 3.

As described above, since the MEMS mirrors constituting the first and second mirror-arrays $2_1, 2_2$ inherently are switching elements which operate mechanically, resonance is caused when the frequency of driving signal is higher than the mechanical resonance frequency. Further, when the MEMS mirror is driven by a driving signal having the frequency lower than the resonance frequency, the controlling time until reaching a required angle is prolonged.

In an actual angle control of MEMS mirrors, such as shown in FIG. 9, it is possible to conduct rough adjustment to control the mirror angles at all once at a first controlling time, in accordance with an initial value previously stored in a memory or the like, and to thereafter conduct fine adjustment for finely feedback controlling the mirror angles, thereby reducing the control frequencies and shortening the controlling time. In executing such an angle control, assuming that the frequency of the driving signal is constant, the larger the mirror angle is changed, the larger the amplitude of the resonance of the MEMS mirror becomes, resulting in a longer convergence time period of the resonance of the MEMS mirror.

Thus, it becomes possible to achieve the efficiency of the angle control, by rendering the control circuits 20A to 20D to perform the angle control in accordance with the following sequence, taking account of the aforementioned resonance behavior of the MEMS mirrors. Namely, for example, as shown in FIG. 10, each of the control circuits 20A to 20D conducts the rough adjustment operations sequentially for all of the optical paths within the same region during a first controlling period for conducting the rough adjustment of mirror angles, continuously conducts the fine adjustment operation for the same optical path until establishing an optical path during a second controlling period and so forth, for conducting the fine adjustment of the mirror angles, and when one optical path is established, transfers to the fine adjustment operation of the next optical path. Note, the numerals in FIG. 10 correspond to the path numbers assigned to n pieces of optical paths in the same region, respectively. When each of the control circuits 20A to 20D performs the angle control in such a sequence, even if the resonance of large amplitude is caused by the rough adjustment operations for the respective optical paths, such resonance is converged within a lapsed time until the fine adjustment operations are to be conducted during the second controlling period and so forth. Thus, it becomes possible to effectively utilize the convergence time period of the resonance to be possibly caused by the rough adjustment. During the fine adjustment operations, since the angles of mirrors to be controlled are extremely small, the amplitude of the possibly caused resonance is small and the convergence time period is short, it is possible to continuously perform the angle control for the same optical path until the path establishment.

Further, for example, as shown in FIG. 11, each of the control circuits 20A to 20D may conduct the rough adjustment operations sequentially for all of the optical paths within the same region during the first controlling period for conducting the rough adjustment of mirror angles, and may conduct the fine adjustment operations sequentially for all of the optical paths within the same region during the second controlling period and so forth, for conducting the fine adjustment of the mirror angles, similarly to the first controlling period. When each of the control circuits 20A to 20D conducts the angle control in such a sequence, it becomes possible to utilize the convergence time period of the resonance to be possibly caused by the fine adjustment operation, even if such a convergence time period is to be considered.

Figure 12:
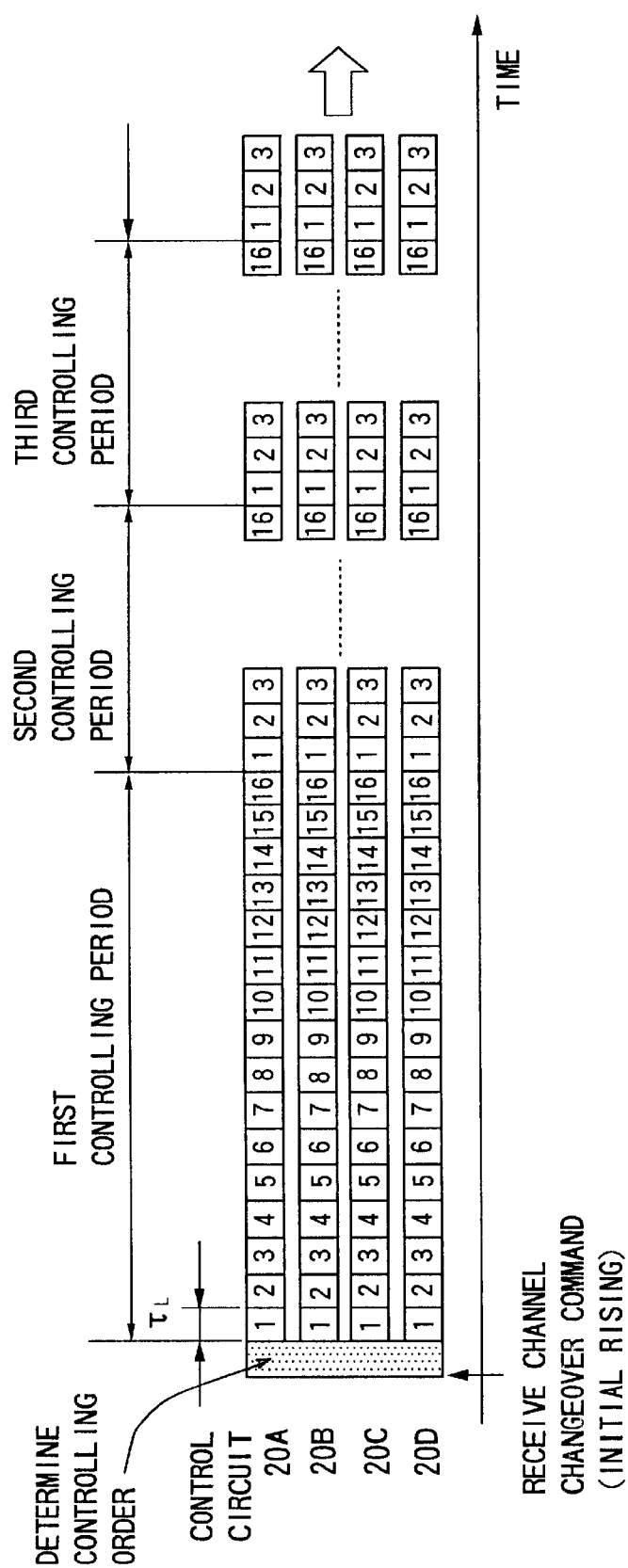
FIG. 12 is a diagram showing specific operations of respective control circuits, when the angle control of FIG. 11 is applied.
Figure 13:
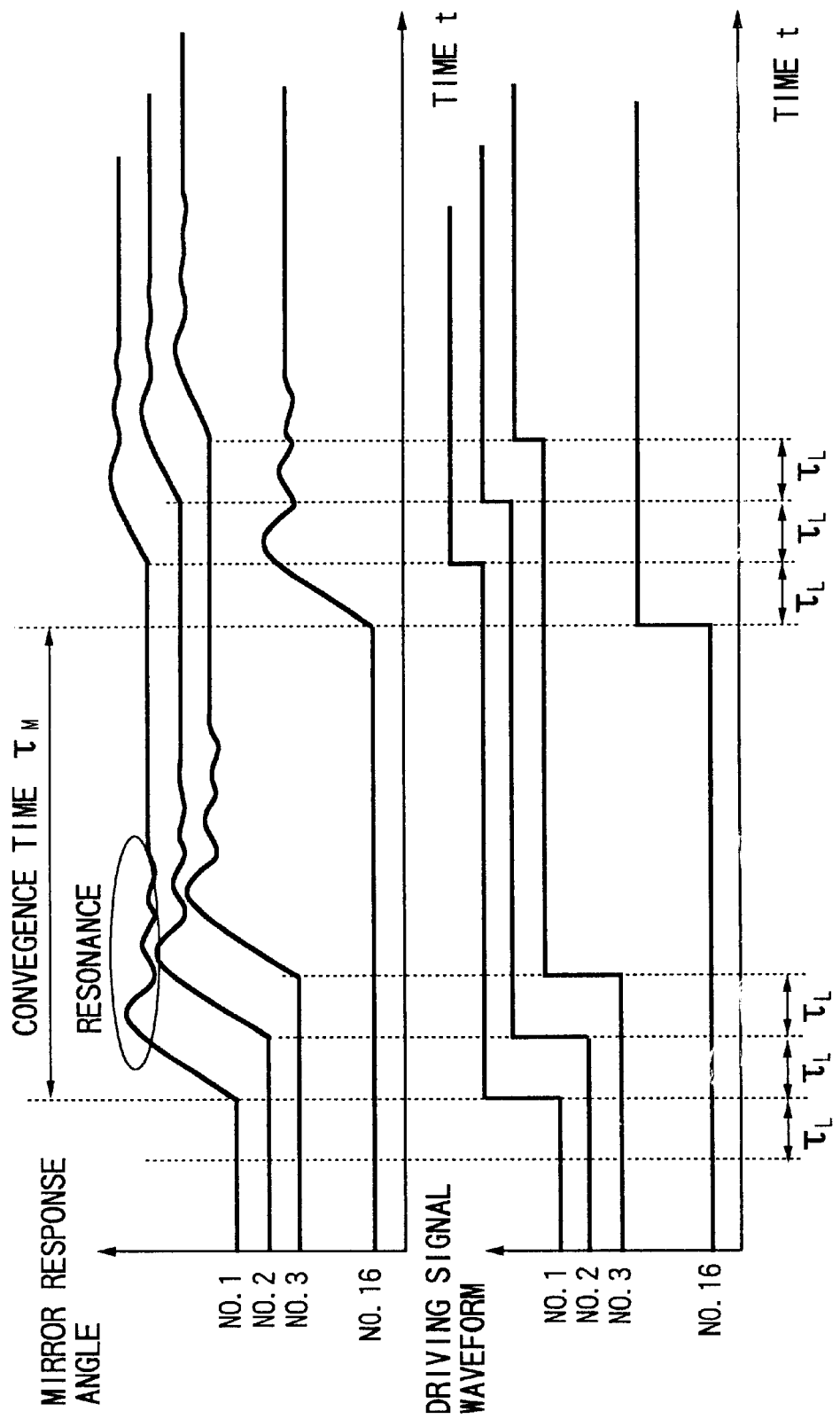
FIG. 13 is a diagram illustrating exemplarily driving signal waveforms and mirror response characteristics in one of the control circuits of FIG. 12.

FIG. 12 is a diagram showing specific operations of the control circuits 20A to 20D, when applying, for example, the procedures of angle control of FIG. 11 to the aforementioned control apparatus shown in FIG. 6. Further, FIG. 13 is a diagram exemplarily showing driving signal waveforms and mirror response characteristics, in one of the control circuits of FIG. 12. Note, the numerals in FIG. 12 correspond to the path numbers assigned to 16 pieces of optical paths in the same region, respectively.

As shown in FIG. 12, when the present control apparatus has received a channel changeover command or the like, so that the start of the angle control is signaled, the control orders are firstly determined by the timing control circuit 23 and these control orders are notified to the control circuits 20A to 20D, respectively. Then, in each of the control circuits 20A to 20D, the rough adjustment operations are conducted for the MEMS mirrors corresponding to the respective optical paths during the first controlling period, in accordance with the determined control order, here, in the ascending order of the optical path number. Note, a time required for the angle control for each optical path is represented by $\tau_L$ here.

In the aforementioned rough adjustment operations, specifically, driving signals having waveforms as shown at the lower section of FIG. 13 are output from the control circuits 20A to 20D, and the corresponding MEMS mirrors are driven sequentially by the respective driving signals, so that the angles of the mirrors are sequentially changed by displacing by one time slot $\tau_L$ as shown at the upper section of FIG. 13. The resonance of MEMS mirrors is converged before the fine adjustment operation for the next controlling period is started, to become stable at a substantially constant value corresponding to the initial value. Note, the convergence time period of the resonance is represented by $\tau_M$ here. Then, the fine adjustment operations are sequentially repeated by the feedback control, so that the angles of the respective MEMS mirrors are controlled to the optimum values, respectively, to thereby establish the respective optical paths.

As described above, each of the control circuits 20A to 20D is to perform the angle control in accordance with the sequence taking account of the resonance behavior of the MEMS mirrors, thereby enabling to more effectively shorten the controlling time.

There will be hereinafter described a preferred specific example of angle control taking account of such a situation where the connection setting of optical paths is changed, over different regions.

In the control apparatus of the present embodiment as described above, since the angle control for MEMS mirrors corresponding to the optical paths is performed in parallel for the respective regions A to D, there may be caused such a situation as will be described in the following where the controlling time is delayed, in a case where optical paths having the established connections are changed, over different regions. Namely, if the timing of angle control of one region is deviated from that of the other region in case of changing the optical path connection over different regions, the angle control of the one region is started after the start of the angle control of the other region, for example. As a result, there is a possibility of prolonging a time required for changing the connections of optical paths. To avoid such a situation, it is effective that the angle control to be in a time-division manner performed for each region is achieved with synchronization between the respective regions.

Figure 14:
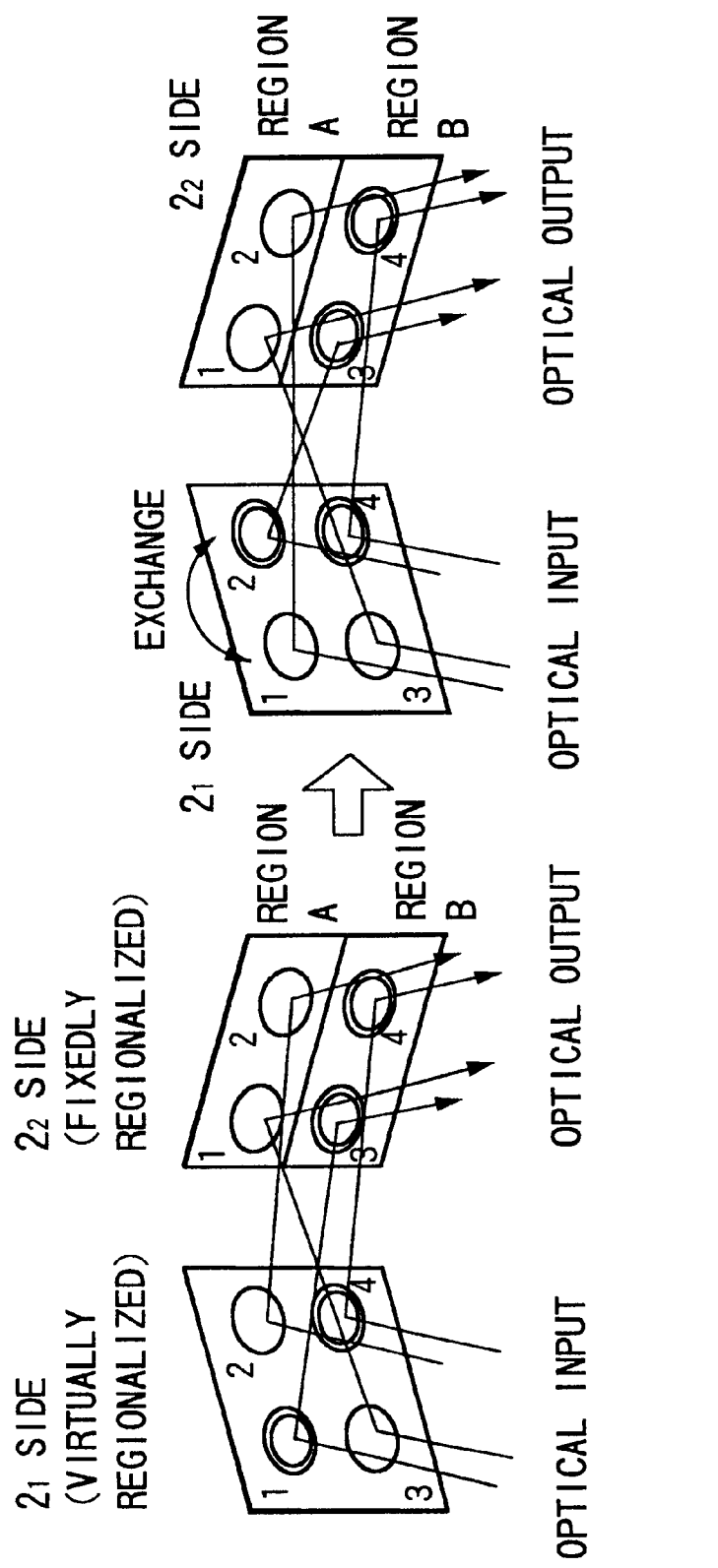
FIG. 14 is a diagram showing an assumed example of a change of optical path connection over different regions, in the embodiment of the present invention.

Specifically, an assumption is made for the optical path connection change such as shown in FIG. 14. Namely, for the second mirror array $2_2$ side, No. 1 and No. 2 MEMS mirrors are set to be included in the fixed region #2-A (single-line circles) and No. 3 and No. 4 MEMS mirrors are set to be included in the fixed region #2-B (double-line circles). Further, before the connection change as shown at the left side of FIG. 14, there are set optical paths for connecting No. 3 and No. 2 MEMS mirrors at the first mirror array $2_1$ side, to No. 1 and No. 2 MEMS mirrors of the fixed region #2-A, respectively, and optical paths for connecting No. 1 and No. 4 MEMS mirrors at the first mirror array $2_1$ side, to No. 3 and No. 4 MEMS mirrors of the fixed region #2-B, respectively. Contrary, after the connection change as shown at the right side of FIG. 14, there are set optical paths for connecting No. 3 and No. 1 MEMS mirrors at the first mirror array $2_1$ side, to No. 1 and No. 2 MEMS mirrors of the fixed region #2-A, and optical paths for connecting No. 2 and No. 4 MEMS mirrors at the first mirror array $2_1$ side, to No. 3 and No. 4 MEMS mirrors of the fixed region #2-B. Namely, according to the assumption here, there shall be conducted such an optical path connection change requiring an exchange over the regions A and B, for No. 1 and No. 2 MEMS mirrors at the first mirror array $2_1$ side.

Figure 15:
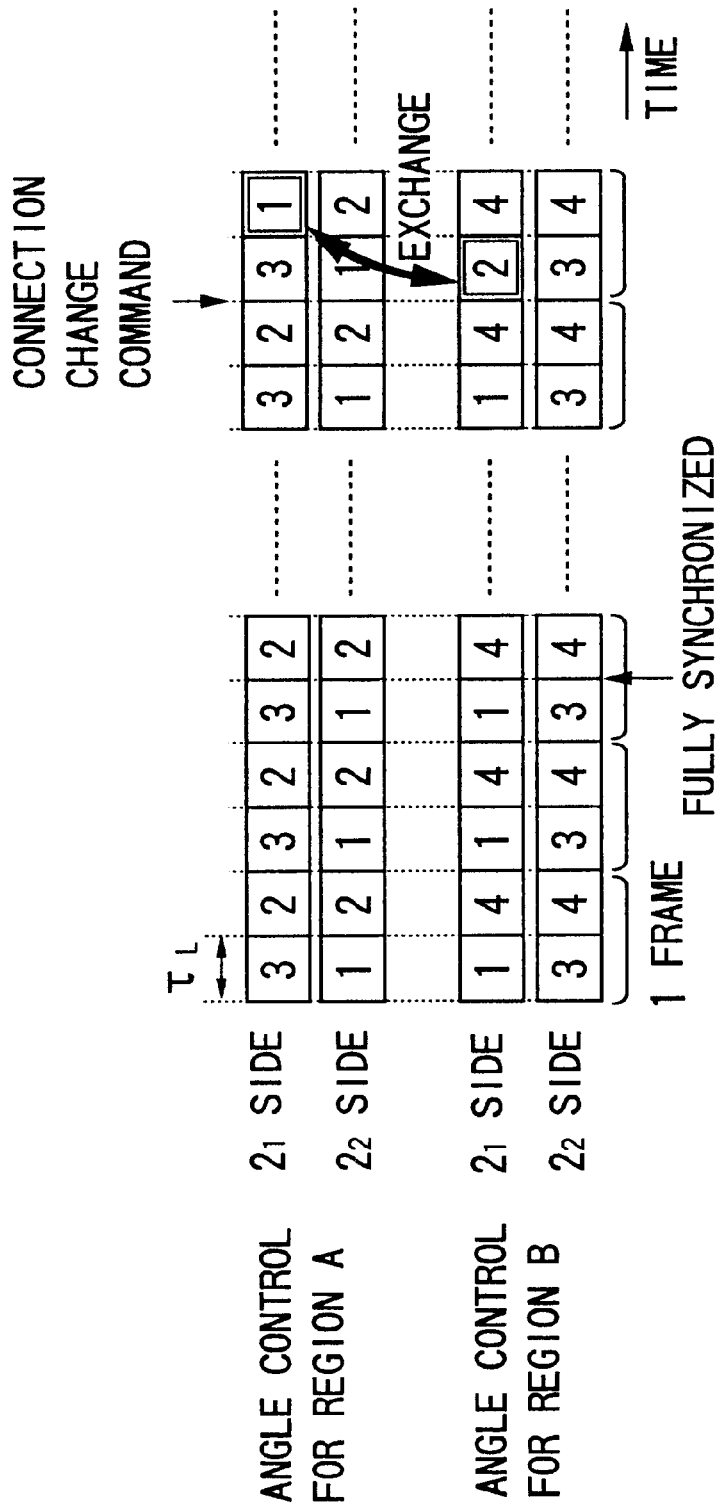
FIG. 15 is a diagram for explaining a preferred specific example of angle control taking account of a change of optical path connection over different regions, in the embodiment of the present invention.

In a case of conducting such an optical path connection change, if the angle control by the control circuit 20A corresponding to the region A and the angle control by the control circuit 20B corresponding to the region B are performed in a full synchronization state as shown in FIG. 15, it becomes possible to instantaneously conduct the exchange of virtual regions set in No. 1 and No. 2 MEMS mirrors at the first mirror array $2_1$ side, when receiving the optical path connection change command as shown at the right side of FIG. 15. Note, the numerals in FIG. 15 denote MEMS mirrors to be angle controlled, and 1 frame indicates a time period (controlling period) required for sequentially controlling all of the MEMS mirrors in the respective regions.

In this way, the angle control to be in a time-division manner performed for each region is performed with synchronization between the respective regions. Thus, it becomes possible to conduct the optical path connection change, over different regions in a short time.

Figure 16:
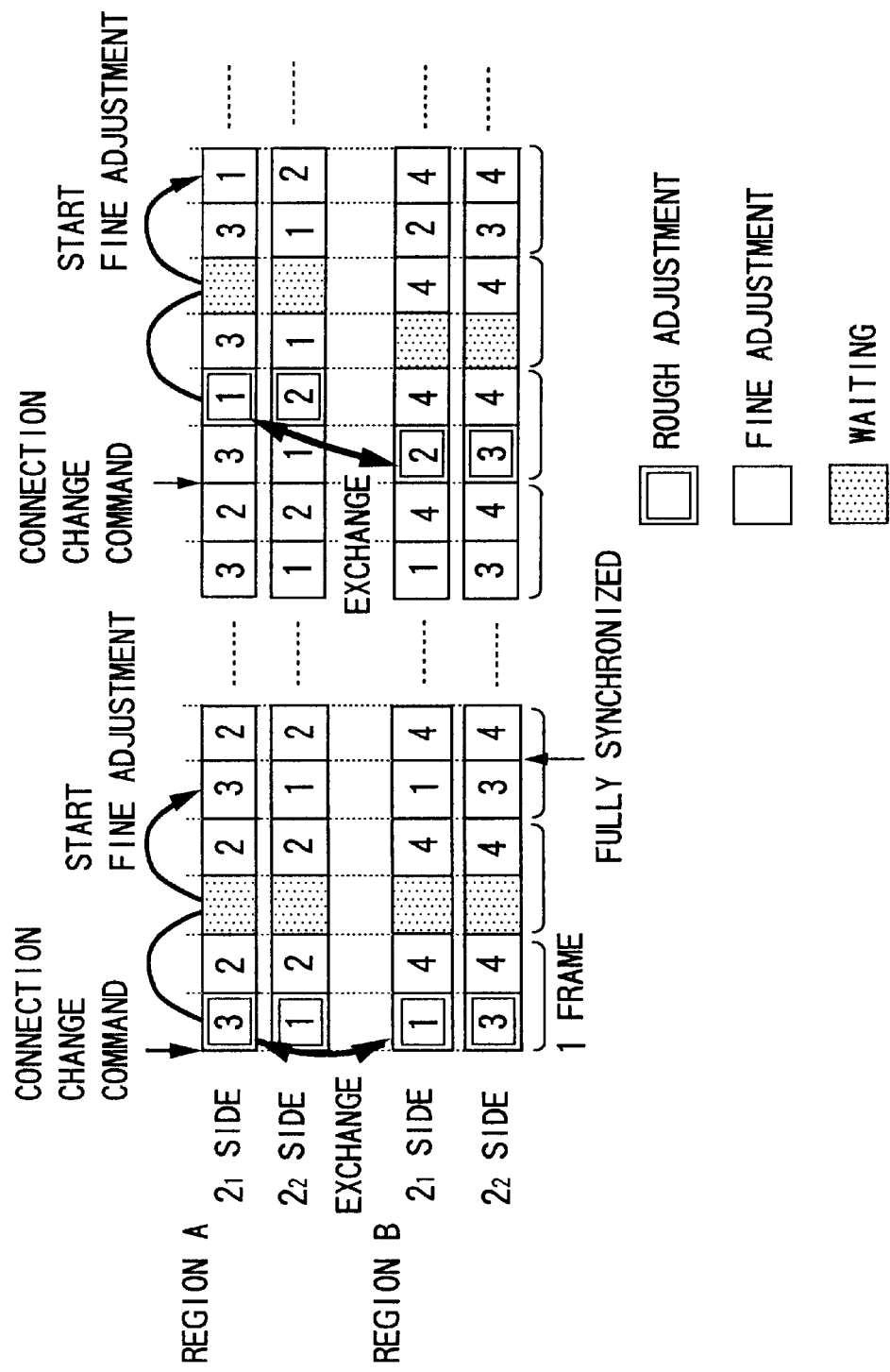
FIG. 16 is a diagram for explaining the angle control taking account of resonance of MEMS mirrors, in relation to the specific example of FIG. 15.

Note, in performing the angle control with synchronization between the respective regions as described above, in order to perform the control taking account of the aforementioned resonance of MEMS mirrors, it is possible to perform the angle control by such a procedure as shown in FIG. 16.

According to the procedure of FIG. 16, when receiving an optical path connection change command, there are firstly conducted the rough adjustment operations for the MEMS mirrors, accompanying the connecting state change. Further, as a method for waiting for the convergence of resonance of the MEMS mirrors, which is caused by these rough adjustment operations, the angle control for each MEMS mirror subjected to rough adjustment based on the connection change is put into a waiting state (that is, a state where no control is performed) once (or multiple times) in the next frame (controlling period) and so forth, and the fine adjustment operation is started after the resonance of such MEMS mirrors has been converged. Such an angle control including the waiting state(s) can be processed in each frame unit, thereby capable to be realized by the following simple circuit structure.

Figure 17:
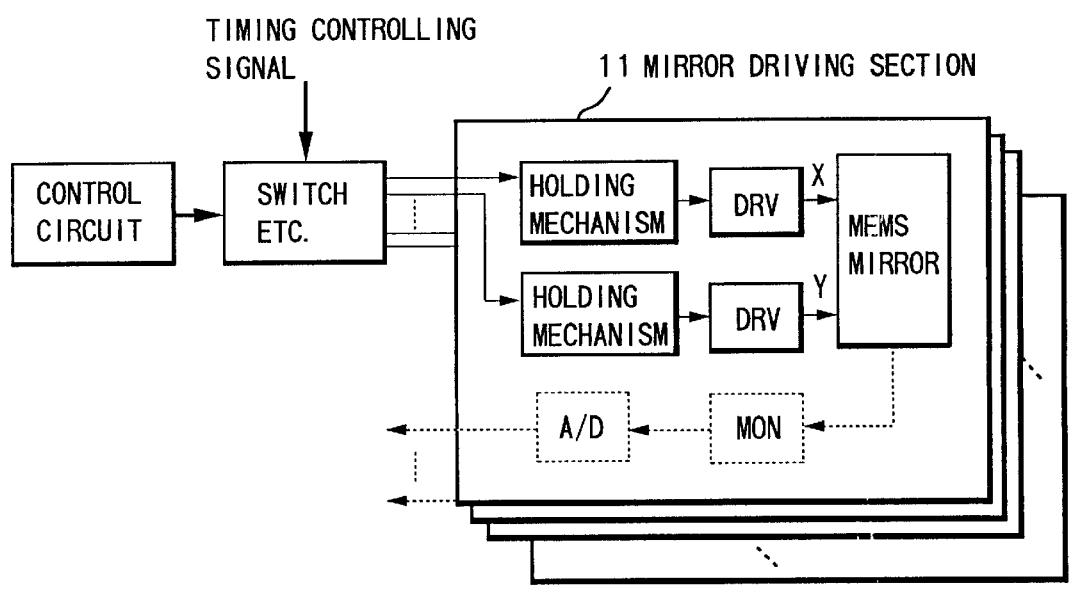
FIG. 17 is a diagram showing an example of a constitution where holding mechanisms are provided at respective mirror driving sections, in the embodiment of the present invention.

In order to put the angle control to be in a time-division manner conducted for each region into a waiting state, the control apparatus is required to have a mechanism for holding any control values. Specifically, for example, as shown in FIG. 17, it is possible to dispose holding mechanisms in the respective mirror driving sections.

Figure 18:
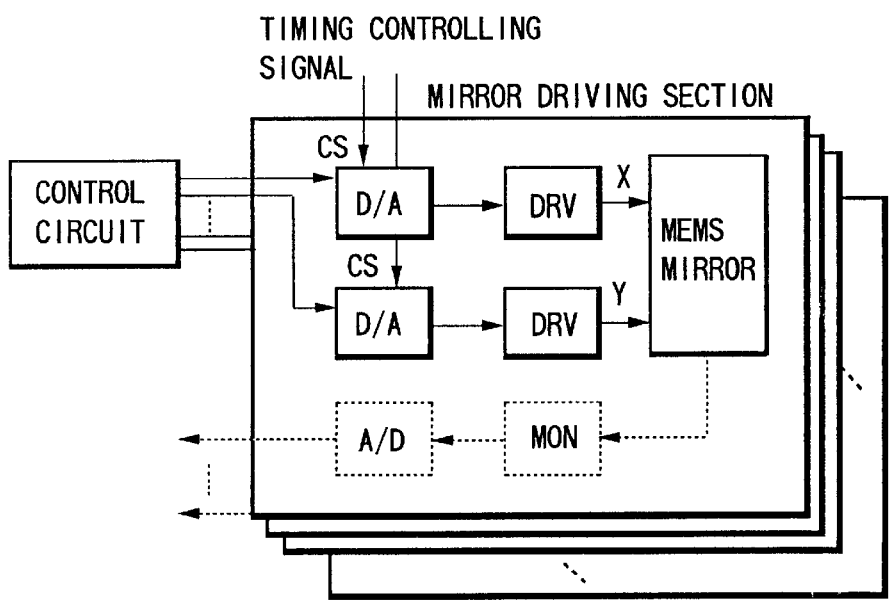
FIG. 18 is a circuit diagram showing a specific example wherein the holding mechanisms in FIG. 17 are realized by utilizing D/A converters.
Figure 19:
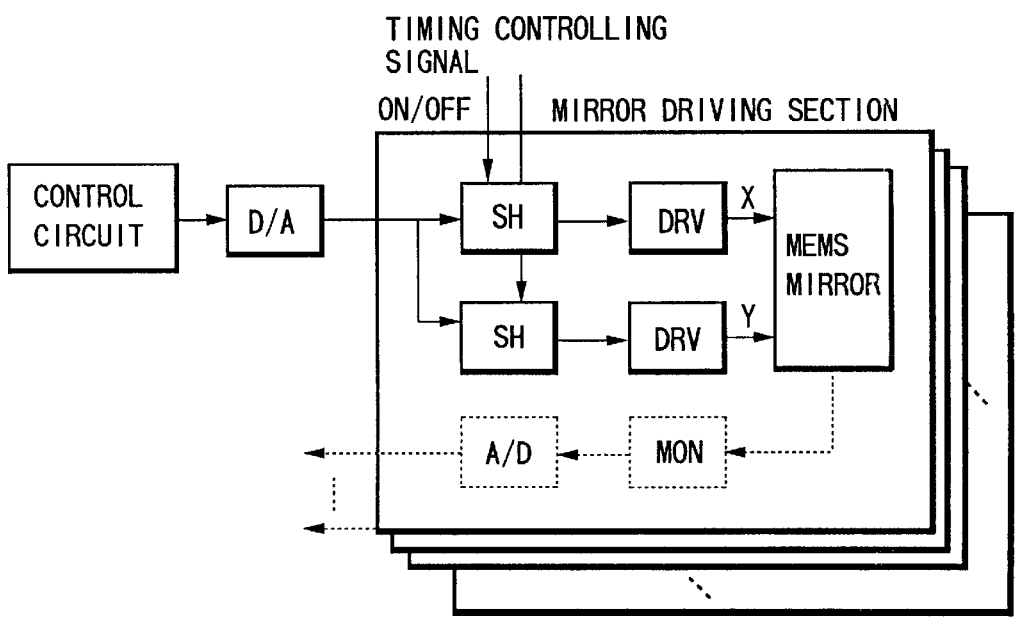
FIG. 19 is a circuit diagram showing a specific example wherein the holding mechanisms in FIG. 17 are realized by utilizing sample-hold circuits.
Figure 20:
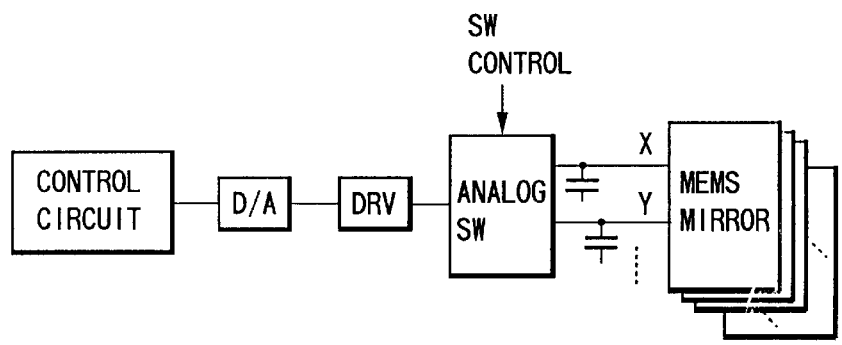
FIG. 20 is a circuit diagram showing a specific example wherein the holding mechanisms in FIG. 17 are realized by utilizing analog-switches and capacitance.

According to the holding mechanism to be provided in each mirror driving section, for example, as shown in FIG. 18, it becomes possible to hold control values, by utilizing chip-select (CS) input terminals of general D/A converters so as to control a write enable state by turning ON the CS input terminal and a state of holding the previous setting by turning OFF the CS input terminal. Each of these D/A converters is arranged between the control circuit (digital circuit) and the driving circuits (analog circuits). Further, for example, as shown in FIG. 19, it is also possible to utilize sample-hold circuits (SH) so as to hold control values. Since the sample-hold circuits are capable of holding analog values, it is apparently enough to provide a single D/A converter for the same region, thereby allowing to diminish the circuit scale as compared with the constitution of FIG. 18. Moreover, for example, as shown in FIG. 20, it is also possible to hold control values by inserting an analog switch between a driving circuit (DRV) and MEMS mirrors, and by providing voltage-holding capacitance at MEMS mirror side output terminals of the analog switch, respectively. In this case, the time-division control in the same region is performed by sequentially switching-over the analog switch. The thus constituted holding mechanism makes it enough to provide only one driving circuit for the same region, thereby enabling to further diminish the circuit scale as compared with even the constitution of FIG. 19.

There will be described hereinafter a method for setting the fixed regions, so as to most effectively realize the diminished circuit scale and the shortened controlling time.

In the control method according to the present invention, N in number of paths of the optical switch can be represented by the product (N=m×n) of "n" in number of paths within one region and "m" in number of fixed regions (=the number of control circuits), as shown by the aforementioned equation (1). Further, the time (1 time slot) $\tau_L$ required for the angle control for each optical path can be represented by the sum of a time period required for reading out an optical power the feedback control, a time period for calculating the control value, and a time period required for D/A converting the calculated control value. Thus, the controlling time T required for establishing all the paths of the optical switch can be represented by the following equation (2) or equation (3), using: "n" in number of paths within one region; one time slot $\tau_L$; a convergence time period $\tau_M$ required for the convergence of the resonance of mirror on an allowable value; and frequencies K for performing the control until the optical path connection is established.

if $$\tau_M \geq (n-1) \times \tau_L, \quad T = K \times (\tau_L + \tau_M) + (n-1) \times \tau_L \qquad (2),$$

and if $$\tau_M \leq (n-1) \times \tau_L, \quad T = K \times n \times \tau_L + \tau_M \qquad (3)$$

Figure 21:
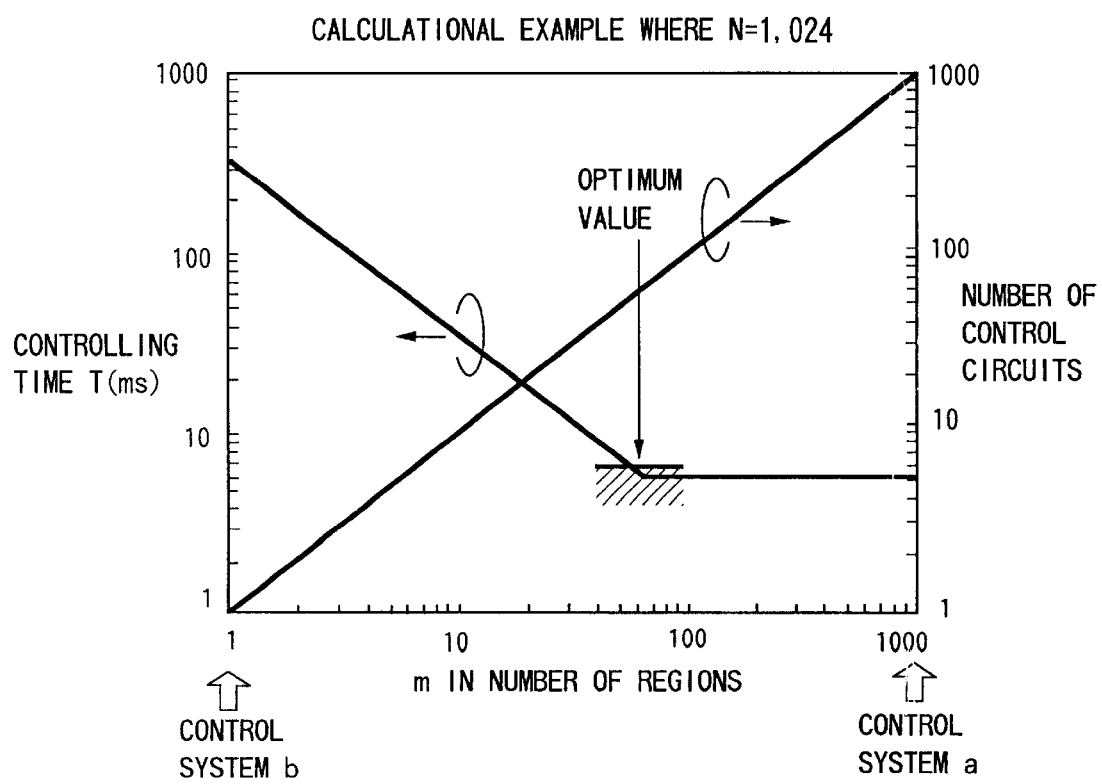
FIG. 21 is a graph showing a calculation example representing a relationship between the number of regions and the controlling time, in the embodiment of the present invention.

FIG. 21 is a graph showing a calculation result, on the assumption that, for example, N in number of paths is 1,024, for the relationships represented by the equations (2) and (3). Note, the abscissa in the graph represents "m" in number of regions by logarithms, while the left ordinate represents the controlling time T by logarithms. Further, the right ordinate represents the number of control circuits by logarithms, so as to reveal the relationship to the diminishment of the circuit scale. As seen from the calculation example of FIG. 21, the controlling time T is substantially kept constant within the range where the value of "m" in number of regions is large (i.e., within the range where "n" in number of paths within one region is small).

Figure 22:
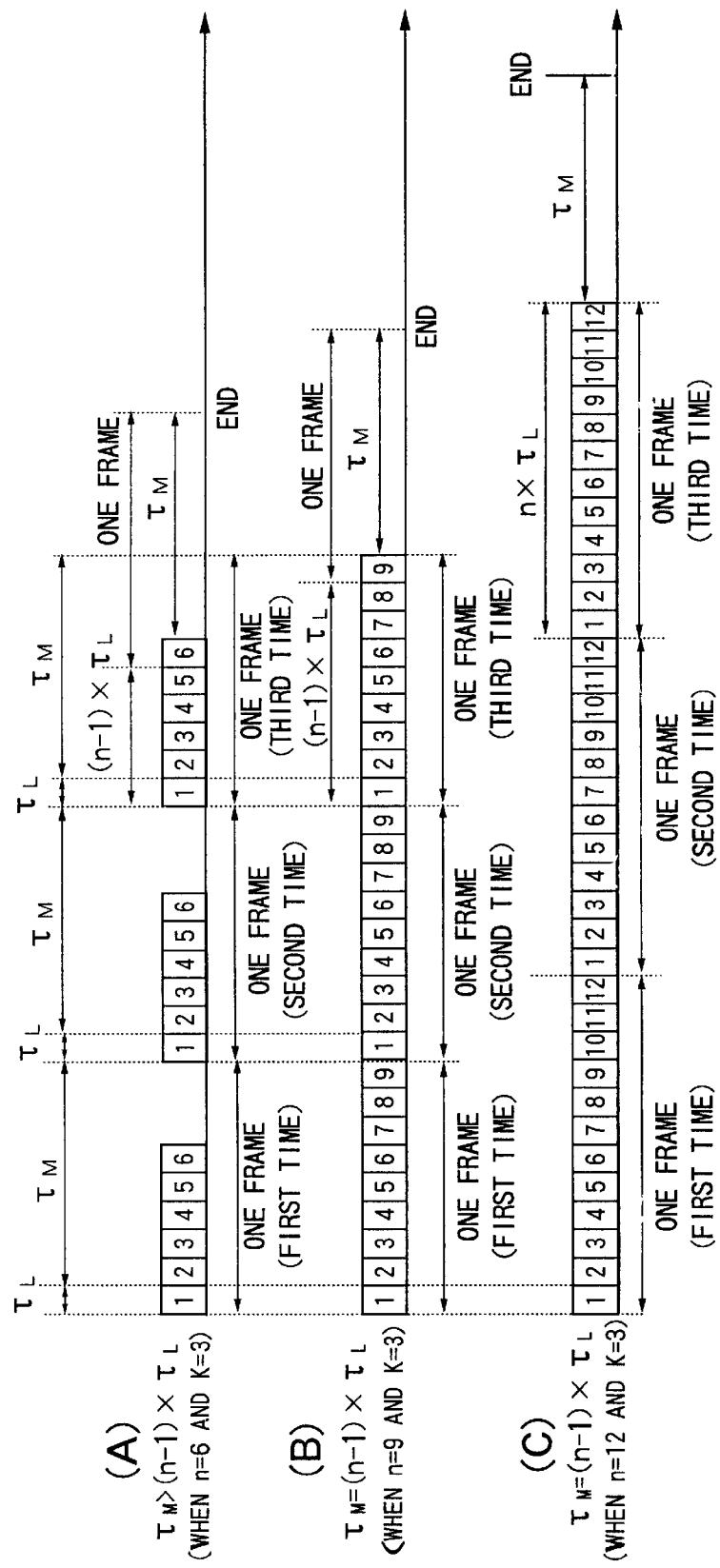
FIG. 22 is a diagram specifically illustrating the relationship between the number of regions and the controlling time in accordance with an order of angle control in the embodiment of the present invention, in which (A), (B) and (C) relate to situations where $\tau_M > (n-1) \times \tau_L$, $\tau_M = (n-1) \times \tau_L$ and $\tau_M < (n-1) \times \tau_L$, respectively.

Further, FIG. 22 is a diagram specifically showing the relationships represented by the equations (2) and (3) in accordance with an order of angle control, in which: (A) shows a situation of $\tau_M > (n-1) \times \tau_L$ while assuming n=6 and K=3; (B) shows a situation of $\tau_M = (n-1) \times \tau_L$ while assuming n=9 and K=3; and (C) shows a situation of $\tau_M < (n-1) \times \tau_L$ while assuming n=12 and K=3. As shown in (A) of FIG. 22, when the value of "n" in number of paths within one region is small, each frame requires a time period for performing no angle control so as to wait for the resonance to be converged. Contrary, as shown in (C) of FIG. 22, when the value of "n" in number of paths within one region is large, the controlling time for each frame becomes long proportionally to "n" in number of paths irrespective of the convergence time of the resonance. Thus, the optimum value of "m" in number of regions corresponding to "n" in number of paths within one region for most effectively realizing the diminishment of the circuit scale and the shortening of the controlling time, is sought out to be at a boundary points such as shown in (B) of FIG. 22 where the equation (2) transitions to the equation (3) or vice versa. Such an optimum value of "m" in number of regions can be obtained by the relationship represented by the following equation (4):

$$\tau_M = (n-1) \times \tau_L = (N/m - 1) \times \tau_L \qquad (4).$$

There will be described hereinafter a preferred specific example of angle control taking account of a situation where at least one path is unused in the optical switch, or in other words, a situation of existence of vacant paths.

Figure 23:
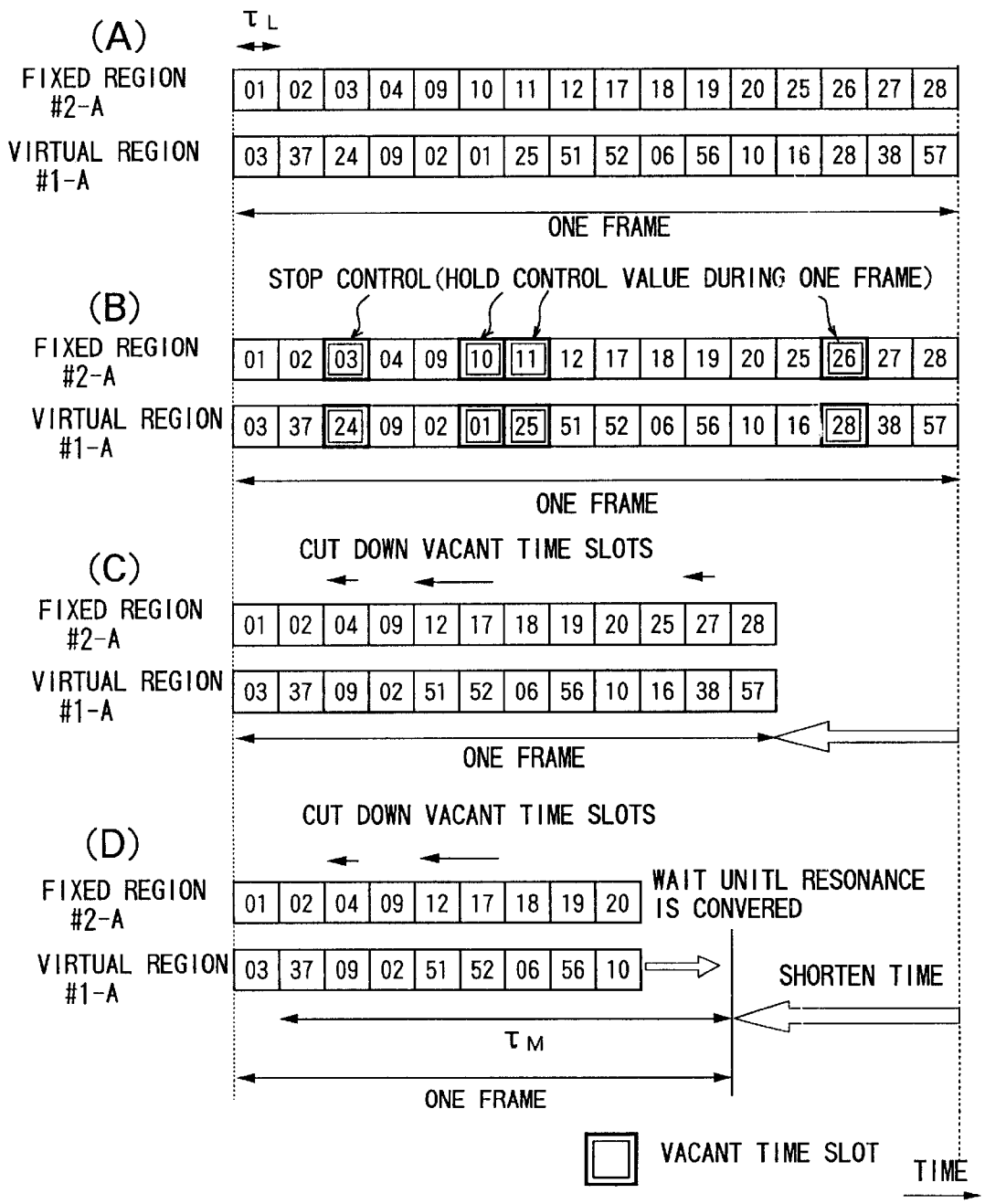
FIG. 23 is a diagram for explaining a preferred specific example of angle control taking account of a situation of existence of vacant paths in the embodiment of the present invention, in which (A) represents a situation where all of the optical paths in one region are used, (B) represents a situation where the operations of control circuits are stopped at time slots of vacant paths, (C) represents a situation where the angle control is performed by cutting down the time slots of vacant paths, and (D) represents a situation where the a controlling time for 1 frame is made to be shorter than a convergence time for resonance.

In the optical switch to be applied with the control apparatus of the present embodiment, there is not only a situation where all of the optical paths within one region (region A, in the figure) are used such as shown in (A) of FIG. 23, but also a situation where one or more (four, in the figure) optical paths are unused as shown in (B) of FIG. 23. For the angle control in such a situation of the existence of one or more vacant paths in the optical switch, it is possible, in a previously determined control order, to adopt such a procedure to stop the operation of control circuit during a time slot without connection setting of optical path, so as not to control the angles of MEMS mirrors corresponding to the vacant path; or to hold the previous controlling state.

Further, for example, as shown in (C) of FIG. 23, in a previously determined control order, the angle control order may be advanced sequentially to the angle control order corresponding to the optical path requiring the connection afterwards, when reaching the control order for a time slot assigned with no connection setting of optical path. Thus, it becomes possible to shorten the controlling time for one frame, by performing the angle control by cutting down the time slots of vacant paths. For example, in a case where usage efficiency of the path connection of optical switch is definite, such an angle control method has an advantage in that it becomes possible to optimize "m" in number of regions in accordance with the aforementioned equation (4) including the usage efficiency.

Note, in a case where the time slots for vacant paths are cut down as in the above manner, for example, when the usage efficiency of the path connection is low as shown in (D) of FIG. 23 so that the controlling time of one frame becomes shorter than the convergence time period $\tau_M$ of resonance, it is enough to wait for the resonance of the mirror to be converged such that the control is not transitioned to the next frame until the lapse of the convergence time period $\tau_M$.

Next, there will be described hereinafter a preferred specific example of angle control, after the aforementioned rough adjustment operation and fine adjustment operation for each region have been completed so that the connections of all optical paths have been established.

In the optical switch to be applied with the control apparatus of the present embodiment as described above, if the MEMS mirrors are left alone without performing any angle control for the MEMS mirrors after once establishing the optical path connections, the control values may be changed by the occurrence of temperature drift of the circuits, characteristic changes of MEMS mirrors or the like, due to environmental fluctuations such as temperature change, earthquake or vibrations by surrounding constructional operations. To avoid changes of control values due to such environmental fluctuations, it is desirable to sequentially correct the angles of MEMS mirrors in accordance with the time-division manner time slots and the control order as those by which the optical path connections have been established.

For such a correction control of mirror angles, it is preferable to set the controlling period (i.e., the length of one frame) in consideration of the environment where the optical switch is installed, especially to set the controlling period to be short such that the correction is made on a vibration condition having a shorter period than temperature fluctuation. By setting the correction period in this way, it becomes possible to compensate for the affection due to environmental fluctuations such as vibrations, thereby enabling to keep in stable the connecting states of all the optical paths of the optical switch.

As a specific method of the aforementioned correction control, the angle in one axial direction of each MEMS mirror is changed to one direction by a minute amount to monitor the output optical power. When the monitored result exhibits an improvement of the optical coupling state, the changed angle is kept. When the monitored result exhibits degradation of the optical coupling state, the changed angle of the MEMS mirror is moved back in the opposite direction by an amount twice the above minute amount, during the next controlling period. By sequentially repeating such angle control for each axial direction of each MEMS mirror, the angle deviation due to environmental fluctuations is corrected.

In the above correction method, when the angle is moved back by the two-fold amount in view of the degraded optical coupling state, the optical coupling efficiency may be conversely degraded. Nonetheless, since such degradation is to be corrected during the next controlling period, the fluctuation of the optical output power is small, and there is substantially no necessity to take account of the affection due to such degradation on the transmission characteristic in the system adopting the present optical switch. Note, when the optical coupling efficiency is degraded after the angle has been moved back by the two-fold amount, the angle may be moved back to the original state during the further next controlling period.

In addition, in the aforementioned correction control, if the change in the optical output power by the angle correction of the MEMS mirror is large, there is caused deterioration of characteristics of optical devices, such as optical receiver, to be connected to the succeeding stage of the present optical switch. As such, it is desirable to set the controlling amount for moving the angle for correction at a small value to the extent that deterioration of receiver sensitivity or the like is not caused. The aforementioned setting of the controlling amount can be easily attained, because the output optical power monitor circuit to be provided in the optical switch control apparatus may have a monitoring band sufficiently narrower than the band of the main signal so that the output optical power monitor circuit may be rendered to have a higher gain and a lower noise than the main signal so as to sufficiently detect such a minute power fluctuation that no way causes deterioration of receiver sensitivity of the main signal.

According to the control apparatus of the present embodiment as described above, it becomes possible to readily realize the diminishment of the circuit scale and the shortening of the controlling time, and to effectively reduce the affection of the resonance behavior of MEMS mirrors on the controlling time and the affection of the environmental fluctuations on the optical coupling states.

What is claimed is:

1. An optical switch control method, which comprises a plurality of mirror arrays each arranged with a plurality of tilt mirrors each having an angle-controllable reflecting surface, and reflects input optical signals sequentially by said mirror arrays, to output said optical signals from particular positions, for controlling an angle of the reflecting surface of each tilt mirror on each of said mirror arrays, wherein the tilt mirrors on one mirror array of said plurality of mirror arrays are divided into a plurality of fixed regions, the tilt mirrors on the other mirror array of said plurality of mirror arrays are divided into a plurality of virtual regions, in accordance with connection states of optical paths, such that the tilt mirrors in each of the virtual regions and the tilt mirrors in each of the fixed regions are related to each other so as to make pairs, and an angle control of reflecting surfaces of the tilt mirrors is performed in parallel for every related regions, and the angle control of reflecting surfaces of the tilt mirrors in the related regions is performed in a time-division manner corresponding to the optical paths.

2. An optical switch control method of claim 1, wherein the power of each optical signal after sequentially reflected by the tilt mirrors of said mirror arrays is detected, to feedback control the angles of reflecting surfaces of the tilt mirrors so that said detected optical signal power is increased.

3. An optical switch control method of claim 2, wherein said detection of optical signal power is conducted by branching a part of the optical signal introduced into an output optical path after sequentially reflected by said mirror arrays, to detect the power of the thus branched light.

4. An optical switch control method of claim 2, wherein said angle control of reflecting surfaces of the tilt mirrors is performed by conducting the fine adjustment by the feedback control after conducting the rough adjustment based on a previously set initial value.

5. An optical switch control method of claim 1, wherein said angle control to be in a time-division manner performed within said related regions is performed by, during a first controlling period, sequentially performing the angle control for a plurality of optical paths within said regions, and, during a second controlling period and so forth, continuously performing the angle control for one of the optical paths within said regions, and after establishing the connection of the one optical path, continuously and sequentially performing the angle control for other optical paths within said regions.

6. An optical switch control method of claim 1, wherein said angle control to be in a time-division manner performed within said related regions is performed by, during each controlling period, sequentially performing the angle control for the plurality of optical paths within said regions.

7. An optical switch control method of claim 1, wherein said angle control to be performed in parallel in each related regions is performed with the synchronization between the respective regions.

8. An optical switch control method of claim 1, wherein when resonance occurs due to a change in angle of the reflecting surface of the tilt mirror, a control value of the tilt mirror is hold so that said angle control to be in a time-division manner performed within said related regions is brought into a waiting state until the resonance is substantially converged.

9. An optical switch control method of claim 1, wherein the number of said fixed regions is set at a minimum value under the condition that the controlling time of the optical switch is minimized as a whole, based on the number of all optical paths to be set in the optical switch, the number of optical paths included in one region, a time period required for the angle control of one optical path, and a time period required until resonance of tilt mirrors is substantially converged.

10. An optical switch control method of claim 1, wherein the order of the angle control to be in a time-division manner performed within said related regions is determined by previously determining the control order for said tilt mirrors divided into said fixed regions, and determining, in accordance with said previously determined control order, the control order for said tilt mirrors divided into said virtual regions, corresponding to connecting states of optical paths.

11. An optical switch control method of claim 1, wherein the angle control to be in a time-division manner performed within said related regions stops driving operations for the tilt mirrors where no optical path connections are set, during controlling period segments for these tilt mirrors.

12. An optical switch control method of claim 1, wherein the order of the angle control to be in a time-division manner performed within said related regions is performed by sequentially cutting down controlling period segments for the tilt mirrors where no optical path connections are set, so as to perform the angle control for only the tilt mirrors where the optical path connections are set.

13. An optical switch control method of claim 12, wherein when one controlling period after sequentially cutting down the controlling period segments for the tilt mirrors where no optical path connections are set, becomes shorter than a convergence time period of resonance of tilt mirrors, an operation for the next controlling period is started after the lapse of said convergence time period.

14. An optical switch control method of claim 1, wherein the angle control of the reflecting surfaces of said tilt mirrors is conducted such that fluctuations of control values due to environmental fluctuations are corrected after establishing optical path connections.

15. An optical switch control method of claim 14, wherein said correction process of the fluctuations of the control values is conducted in a period faster than the vibration frequency for the environmental vibration condition.

16. An optical switch control apparatus which comprises a plurality of mirror arrays each arranged with a plurality of tilt mirrors each having an angle-controllable reflecting surface, and reflects input optical signals sequentially by said mirror arrays, to output said optical signals from particular positions, for controlling an angle of the reflecting surface of each tilt mirror on each of said mirror arrays, wherein one mirror array of said plurality of mirror arrays has a plurality of fixed regions divided from the tilt mirrors on said mirror array, the other mirror array of said plurality of mirror arrays has a plurality of virtual regions that have been divided from the tilt mirrors on said other mirror array in accordance with connection states of optical paths, such that the tilt mirrors in each of the virtual regions and the tilt mirrors in each of the fixed regions are related to each other so as to make pairs, there are provided a plurality of control circuits corresponding to said related regions, and each of said control circuits performs an angle control of reflecting surfaces of the tilt mirrors in parallel for every related regions, and performs the angle control of reflecting surfaces of the tilt mirrors in the corresponding related regions in a time-division manner corresponding to the optical paths.

17. An optical switch control apparatus of claim 16, further comprising;

an optical power detecting section for detecting the power of optical signal after sequentially reflected by the said mirror arrays, wherein each of said control circuit feedback controls the angles of reflecting surfaces of the tilt mirrors so that the optical signal power detected by said optical power detecting section is increased.

18. An optical switch control apparatus of claim 16, wherein each of said tilt mirrors is a mirror having a three-dimensional structure of beam steering system.

19. An optical switch control apparatus of claim 16, wherein each of said tilt mirrors is a tilt mirror fabricated by applying a micro electric mechanical system (MEMS) technique.

20. An optical switch control apparatus of claim 16, further comprising;

a plurality of driving sections for driving said tilt mirrors, respectively, wherein among said plurality of driving sections, the driving sections corresponding to the tilt mirrors divided into said fixed regions are divided into groups for said related regions, respectively, such that operations of said driving sections of the groups are selectively controlled in response to control signals from said control circuit corresponding to said regions, respectively.

21. An optical switch control apparatus of claim 20, wherein each of said plurality of driving sections includes a holding mechanism capable of holding control values for controlling a driving state of the driving section itself.

22. An optical switch control apparatus of claim 21, wherein said holding mechanism includes a D/A converter.

23. An optical switch control apparatus of claim 21, wherein said holding mechanism includes a sample-hold circuit.

24. An optical switch control apparatus of claim 21, wherein said holding mechanism includes an analog switch and capacitances connected to output terminals of said analog switch.

* * * * *